US012806518B2

(12) United States Patent
Xue et al.

(10) Patent No.: US 12,806,518 B2
(45) Date of Patent: *Nov. 24, 2026

(54) VIRTUAL VEHICLE CONTROL METHOD AND APPARATUS, DEVICE, AND STORAGE MEDIUM

(71) Applicant: Tencent Technology (Shenzhen) Company Limited, Shenzhen (CN)

(72) Inventors: Haosheng Xue, Shenzhen (CN); Jinlong Tu, Shenzhen (CN); Zhipeng Luo, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 199 days.

This patent is subject to a terminal disclaimer.

(21) Appl. No.: 18/745,924

(22) Filed: Jun. 17, 2024

(65) Prior Publication Data

US 2024/0335741 A1 Oct. 10, 2024

Related U.S. Application Data

(63) Continuation of application No. PCT/CN2023/087583, filed on Apr. 11, 2023.

(30) Foreign Application Priority Data

May 20, 2022 (CN) ........................ 202210557035.X

(51) Int. Cl.
*A63F 13/422* (2014.01)
*A63F 13/533* (2014.01)
(Continued)

(52) U.S. Cl.
CPC .......... *A63F 13/422* (2014.09); *A63F 13/533* (2014.09); *A63F 13/57* (2014.09);
(Continued)

(58) Field of Classification Search
CPC ........ A63F 13/803; A63F 13/42; A63F 13/57; A63F 13/245; A63F 13/573;
(Continued)

(56) References Cited

U.S. PATENT DOCUMENTS 6,171,186 B1 * 1/2001 Kurosawa ............... A63F 13/48 463/31
7,602,397 B2 * 10/2009 Okubo .................. A63F 13/803 715/705
(Continued)

FOREIGN PATENT DOCUMENTS

CN 106861186 A 6/2017
CN 108525303 A 9/2018
(Continued)

OTHER PUBLICATIONS

Tencent Technology, ISR, PCT/CN2023/087583, Sep. 5, 2023, 3 pgs.
(Continued)

*Primary Examiner* — William H Mcculloch, Jr.
(74) *Attorney, Agent, or Firm* — Morgan, Lewis & Bockius LLP

(57) ABSTRACT

A virtual vehicle control method is performed by a computer device. The method includes: displaying a virtual vehicle in a virtual scene, the virtual vehicle being in a drifting state in a curve; controlling a vehicle speed of the virtual vehicle to decrease in accordance with a first trigger operation on a brake control part; displaying prompt information of consuming acceleration energy in accordance with a second trigger operation on an energy control part; and applying a curve exit skill to the virtual vehicle to be in an accelerating state during a skill use period of the curve exit skill in accordance with a third trigger operation on an accelerator control part.

20 Claims, 15 Drawing Sheets

(51) Int. Cl.
*A63F 13/57* (2014.01)
*A63F 13/803* (2014.01)

(52) U.S. Cl.
CPC ........ *A63F 13/803* (2014.09); *A63F 2300/64* (2013.01); *A63F 2300/8017* (2013.01)

(58) Field of Classification Search
CPC ............ A63F 13/537; A63F 2300/8017; A63F 2300/64; A63F 2300/646
See application file for complete search history.

(56) References Cited

U.S. PATENT DOCUMENTS

| | | | | |
|---|---|---|---|---|
| 7,625,287 | B2 * | 12/2009 | Champagne | G06F 3/0488 463/6 |
| 8,078,300 | B2 * | 12/2011 | Takagi | A63F 13/10 700/94 |
| 9,687,741 | B1 * | 6/2017 | Kim | A63F 13/2145 |
| 11,135,513 | B2 * | 10/2021 | Li | A63F 13/5378 |
| 11,344,810 | B2 * | 5/2022 | Huang | A63F 13/42 |
| 11,684,856 | B2 * | 6/2023 | Weng | A63F 13/422 463/6 |
| 11,701,589 | B2 * | 7/2023 | Huang | A63F 13/57 463/31 |
| 2007/0077541 | A1 * | 4/2007 | Champagne | A63F 13/10 434/62 |
| 2008/0096654 | A1 * | 4/2008 | Mondesir | A63F 13/213 463/31 |
| 2008/0218529 | A1 * | 9/2008 | Okubo | A63F 13/803 345/619 |
| 2020/0353356 | A1 * | 11/2020 | Li | A63F 13/803 |
| 2021/0187393 | A1 * | 6/2021 | Huang | A63F 13/42 |
| 2021/0245053 | A1 * | 8/2021 | Weng | A63F 13/422 |
| 2024/0325887 | A1 * | 10/2024 | Xue | A63F 13/422 |
| 2024/0325888 | A1 * | 10/2024 | Xue | A63F 13/42 |
| 2024/0325933 | A1 * | 10/2024 | Xue | A63F 13/56 |
| 2024/0335741 | A1 * | 10/2024 | Xue | A63F 13/42 |
| 2024/0350926 | A1 * | 10/2024 | Xue | A63F 13/803 |

FOREIGN PATENT DOCUMENTS

| | | | |
|---|---|---|---|
| CN | 109806586 | A | 5/2019 |
| CN | 110052027 | A | 7/2019 |
| CN | 110368681 | A | 10/2019 |
| CN | 111773720 | A | 10/2020 |
| CN | 112755531 | A | 5/2021 |
| WO | WO 2018091861 | A1 | 5/2018 |

OTHER PUBLICATIONS

Anonymous, (Non-official translation) “Who Doesn’t Know This!? Eight Tips to Help You Get to the Finish Line at Top Speed”, Online mobile edition of Need for Speed, Official website, Tencent Games, Aug. 2022, Retrieved from the Internet: https://pracingol.qq.com/gicp/news/1030/18096733.html.

3dmgame.com, Luo Chen, “Need for Speed 19 Drift Theory and Performance Balance Gameplay Analysis and Guide”, Mar. 2020, Retrieved from the Internet: https://www.3dmgame.com/gl/3554468.html.

* cited by examiner

VIRTUAL VEHICLE CONTROL METHOD AND APPARATUS, DEVICE, AND STORAGE MEDIUM

CROSS-REFERENCE TO RELATED APPLICATIONS

This application is a continuation application of PCT Patent Application No. PCT/CN2023/087583, entitled "VIRTUAL VEHICLE CONTROL METHOD AND APPARATUS, DEVICE, AND STORAGE MEDIUM" filed on Apr. 11, 2023, which claims priority to Chinese Patent Application No. 202210557035.X, entitled "VIRTUAL VEHICLE CONTROL METHOD AND APPARATUS, DEVICE, AND STORAGE MEDIUM" filed on May 20, 2022, both of which are incorporated by reference in their entirety.

FIELD OF THE TECHNOLOGY

This application relates to the field of virtual worlds, and specifically, to a virtual vehicle control method and apparatus, a device, and a storage medium.

BACKGROUND OF THE DISCLOSURE

In a network game with a virtual environment, a player may control a virtual character and control activities and behaviors of the virtual character in the virtual world of the game. Taking virtual racing as an example, a player may control a virtual vehicle to compete or travel for sightseeing on a virtual road.

During travel, the virtual vehicle may encounter a curve, and a series of operations such as entering the curve, traveling around the curve, and exiting from the curve are required to be carried out. In this process, entering a drifting state may bring a sharp deceleration to the virtual vehicle. Therefore, after drifting around the curve, the virtual vehicle has a speed-up demand.

SUMMARY

Embodiments of this application provide a virtual vehicle control method and apparatus, a device, and a storage medium. The technical solutions are as follows:

According to one aspect of this application, a virtual vehicle control method is performed by a computer device, and the method includes:

- displaying a virtual vehicle in a virtual scene, the virtual vehicle being in a drifting state in a curve;
- controlling a vehicle speed of the virtual vehicle to decrease in accordance with a first trigger operation on a brake control part;
- displaying prompt information of consuming acceleration energy in accordance with a second trigger operation on an energy control part; and
- applying a curve exit skill to the virtual vehicle to be in an accelerating state during a skill use period of the curve exit skill in accordance with a third trigger operation on an accelerator control part. The skill use period of the curve exit skill is configured for indicating accelerating duration of the virtual vehicle, and the skill use period of the curve exit skill is longer than accelerating duration of the virtual vehicle when the acceleration energy is used while the virtual vehicle is not in the drifting state.

According to one aspect of this application, a computer device is provided, the computer device including a processor and a memory, the memory having a computer program stored therein, and the computer program being loaded and executed by the processor and causing the computer device to implement the foregoing virtual vehicle control method.

According to one aspect of this application, a non-transitory computer-readable storage medium is provided. The storage medium has a computer program stored therein. The computer program, when executed by a processor of a computer device, causes the computer device to implement the foregoing virtual vehicle control method.

A curve exit skill is used by sequential trigger operations on a brake control part, an energy control part, and an accelerator control part to control a virtual vehicle to be in an accelerating state during a skill use period, thereby satisfying a speed-up requirement of the virtual vehicle during drifting of the virtual vehicle around a curve. A first trigger operation on the brake control part is configured for enhancing grip of the virtual vehicle. In a case that the virtual vehicle has high grip, a spin speed of the virtual vehicle is increased, and the curve exit skill is used by a second trigger operation on the energy control part and a third trigger operation on the accelerator control part to achieve acceleration of the virtual vehicle, reducing a sliding distance of the rear part of the virtual vehicle, allowing the vehicle body of the virtual vehicle to be able to be corrected quickly, thereby making a travel track of the virtual vehicle in a curve exit process more reasonable, and achieving a better speed-up effect.

DESCRIPTION OF EMBODIMENTS

Figure 1:
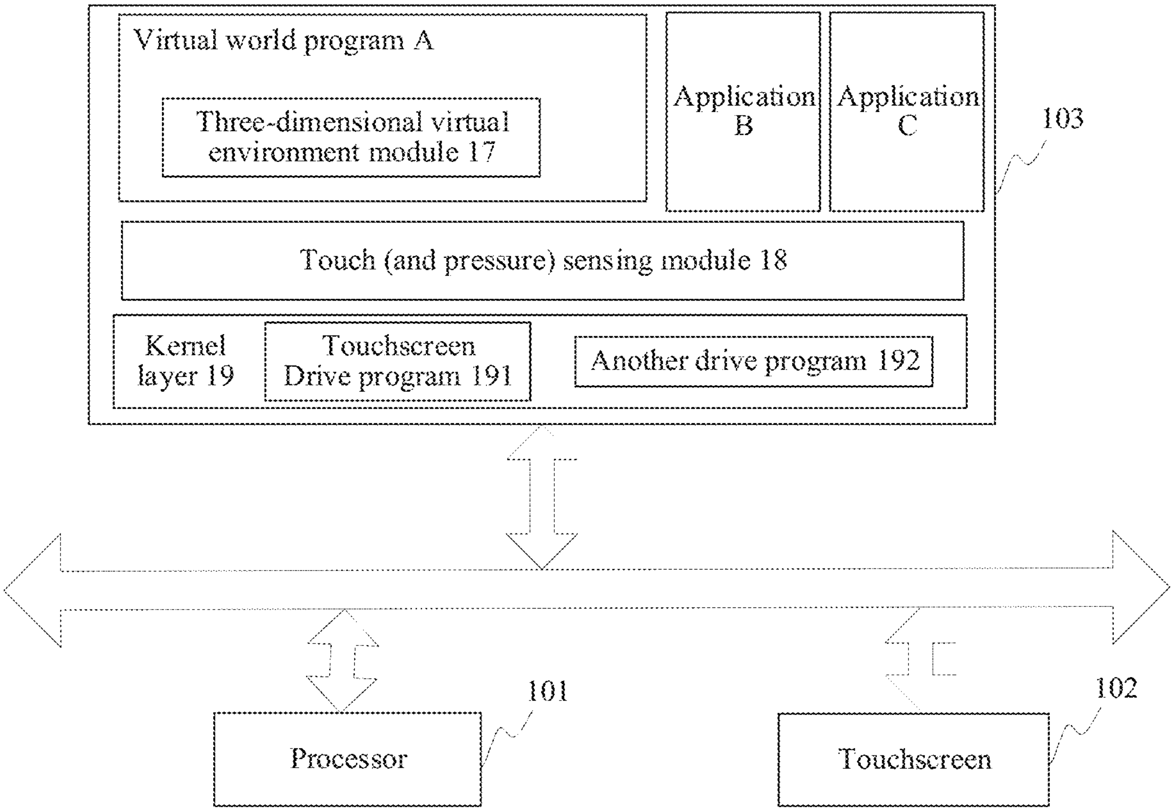
FIG. 1 is a schematic structural diagram of a terminal according to an exemplary embodiment of this application.

The method provided in this application may be applied in an application having a virtual environment and a virtual character. Exemplarily, an application supporting a virtual environment is an application in which a user can control movement of a virtual character within the virtual environment. Exemplarily, the method provided in this application may be applied to: any one of a virtual reality (VR) application, an augmented reality (AR) program, a three-dimensional map program, a virtual reality game, an augmented reality game, a first-person shooting game (FPS), a third-person shooting game (TPS), a multiplayer online battle arena games (MOBA), and a simulation game (SLG).

Exemplarily, a game in a virtual environment is composed of maps of one or more game worlds. The virtual environment in the game simulates a real-world scene, and a user can control a virtual character in the game to carry out actions such as walking, running, jumping, shooting, combating, and driving in the virtual environment. The interactivity is strong, and a plurality of users can be teamed online for competitive games.

In some embodiments, the application may be a shooting game, a racing game, a role-playing game, an adventure game, a sandbox game, a battle arena game, or other programs. A client may support at least one of a Windows operating system, an Apple's operating system, an Android operating system, an IOS operating system, and a LINUX operating system, and clients of different operating systems may be interconnected. In some embodiments, the above client is a program suitable for a mobile terminal having a touchscreen.

For example, the virtual vehicle control method provided by the embodiments of this application may be applied to an application supporting a racing game, and a player controls a virtual vehicle to participate in a virtual racing game. For another example, the virtual vehicle control method provided by the embodiments of this application may be applied to an application supporting a role-playing game, and a player controls a virtual vehicle to travel in a virtual scene to meet the sightseeing needs of the player.

Exemplarily, the virtual vehicle in this application may be a virtual vehicle that simulates driving features of an automobile in the real world, and the virtual vehicle is not limited by the appearance. For example, a virtual driver travels on a virtual cloud in a virtual environment, and even if the appearance of the driver has appearance features of virtual wings, the driver conforms to driving features of an automobile, and is traveling on the virtual cloud, rather than relying on a lift force or simulating a lift force for pitch angle changes, which also falls within the scope of virtual vehicles shown in this application. Furthermore, this application does not limit a virtual vehicle control manner, and the virtual vehicle can be controlled by a keyboard, a mouse, a gamepad, or a steering wheel and a pedal simulating driving of a vehicle, which is not limited in this application. The virtual vehicle control method may be applied to a virtual vehicle racing application, may also be applied to a virtual vehicle driving simulation application, or may also be applied to other applications having a vehicle racing or vehicle driving simulation function.

In some embodiments, the client is an application developed based on a three-dimensional engine, such as a Unity engine.

The terminal in this application may be a desktop computer, a laptop portable computer, a mobile phone, a tablet computer, an ebook reader, a Moving Picture Experts Group Audio Layer III (MP3) player, a Moving Picture Experts Group Audio Layer IV (MP4) player, or the like. A client supporting a virtual environment is installed and running in the terminal, such as a client of an application supporting a three-dimensional virtual environment. The application may be any one of a battle royale (BR) game, a virtual reality application, an augmented reality program, a three-dimensional map program, TPS, FPS, or MOBA. In some embodiments, the application may be a stand-alone application, such as a stand-alone 3D game program, or may also be an online application.

FIG. 1 is a schematic structural diagram of a terminal according to an exemplary embodiment of this application. The terminal includes a processor 101, a touchscreen 102, and a memory 103.

The processor 101 may be at least one of a single-core processor, a multi-core processor, an embedded chip, or a processor having an instruction running capability.

The touchscreen 102 may be an ordinary touchscreen or a pressure-sensitive touchscreen. The ordinary touchscreen may measure a press operation or a slide operation applied on the touchscreen 102. The pressure-sensitive touchscreen may measure pressing strength applied on the touchscreen 102.

The memory 103 stores a program that can be executed by the processor 101. Schematically, the memory 103 has a virtual environment program A, an application B, an application C, a touch pressure sensing module 18, and a kernel layer 19 of an operating system stored therein. The virtual environment program A is an application developed based on a three-dimensional virtual environment module 17. In some embodiments, the virtual environment program A includes, but is not limited to, at least one of a game program, a virtual reality program, a three-dimensional map program, a three-dimensional presentation program developed by the three-dimensional virtual environment module (also referred to as a virtual environment module) 17. For example, when the operating system of the terminal is the Android operating system, the virtual environment program A is developed using the Java programming language and the C# language. For another example, when the operating system of the terminal is the IOS operating system, the virtual environment program A is developed using the Object-C programming language and the C# language.

The three-dimensional virtual environment module 17 is a module supporting a plurality of operating system platforms. Schematically, the three-dimensional virtual environment module may be applied to program development in a plurality of fields such as the game development field, the VR field, and the three-dimensional map field. A specific type of the three-dimensional virtual environment module 17 is not limited in the embodiments of this application. An example in which the three-dimensional virtual environment module 17 is a module developed by using the Unity engine is used in the following embodiment for description.

The touch (and pressure) sensing module 18 is a module configured to receive a touch event (and a pressure touch event) reported by a touchscreen drive program 191. The touch sensing module may not have a pressure sensing function, and not receive a pressure touch event. A touch event includes: a type and coordinate values of the touch event. Types of touch events include but are not limited to: a touch start event, a touch move event, and a touchdown event. A pressure touch event includes: a pressure value and coordinate values of the pressure touch event. This coordinate values are configured for indicating a touch position of a pressure touch operation on a display screen. In some embodiments, a two-dimensional coordinate system is obtained by establishing an abscissa axis in the horizontal direction of the display screen and an ordinate axis in the vertical direction of the display screen.

Schematically, the kernel layer 19 includes the touchscreen drive program 191 and another drive program 192. The touchscreen drive program 191 is a module configured to detect a pressure touch event. When detecting a pressure touch event, the touchscreen drive program 191 transfers the pressure touch event to the pressure sensing module 18.

Another drive program 192 may be a drive program related to the processor 101, a drive program related to the memory 103, a drive program related to a network component, a drive program related to a sound component, or the like.

The memory 102 may include one or more computer-readable storage media. The computer-readable storage medium may be non-transient. The memory 103 may further include a high-speed random-access memory and a non-volatile memory, for example, one or more disk storage devices or flash storage devices. In some embodiments, the non-transitory computer-readable storage medium in the memory 103 is configured to store at least one instruction, and the at least one instruction is configured to be executed by the processor 101 to implement the virtual vehicle control method provided in the method embodiments of this application.

In some embodiments, the touchscreen 102 is an optional component of the terminal. In some embodiments, the touchscreen 102 may not be included in the terminal, or the touchscreen 102 may be replaced with a display screen that does not include touch functionality. In this case, the touchscreen drive program 191 may also become an optional component. Exemplarily, the terminal includes the processor 101 and the memory 103, and the touchscreen drive program 191 may not be included in the memory 103, in which case a screen display program may be included.

In some embodiments, the terminal may alternatively include a peripheral device interface and at least one peripheral device. The processor 101, the memory 103, and the peripheral device interface may be connected through a bus or a signal cable. Each peripheral may be connected to the peripheral device interface through a bus, a signal cable, or a circuit board. In some embodiments, the peripheral device includes: at least one of a radio frequency circuit, a camera component, an audio circuit, or a power supply.

A person skilled in the art may know that the foregoing is merely a general illustration of the structure of a terminal. In different embodiments, the terminal may have more or fewer components. For example, the terminal may further include a gravitational acceleration sensor, a gyroscope sensor, a pressure sensor, an optical sensor, a proximity sensor, or the like.

Figure 2:
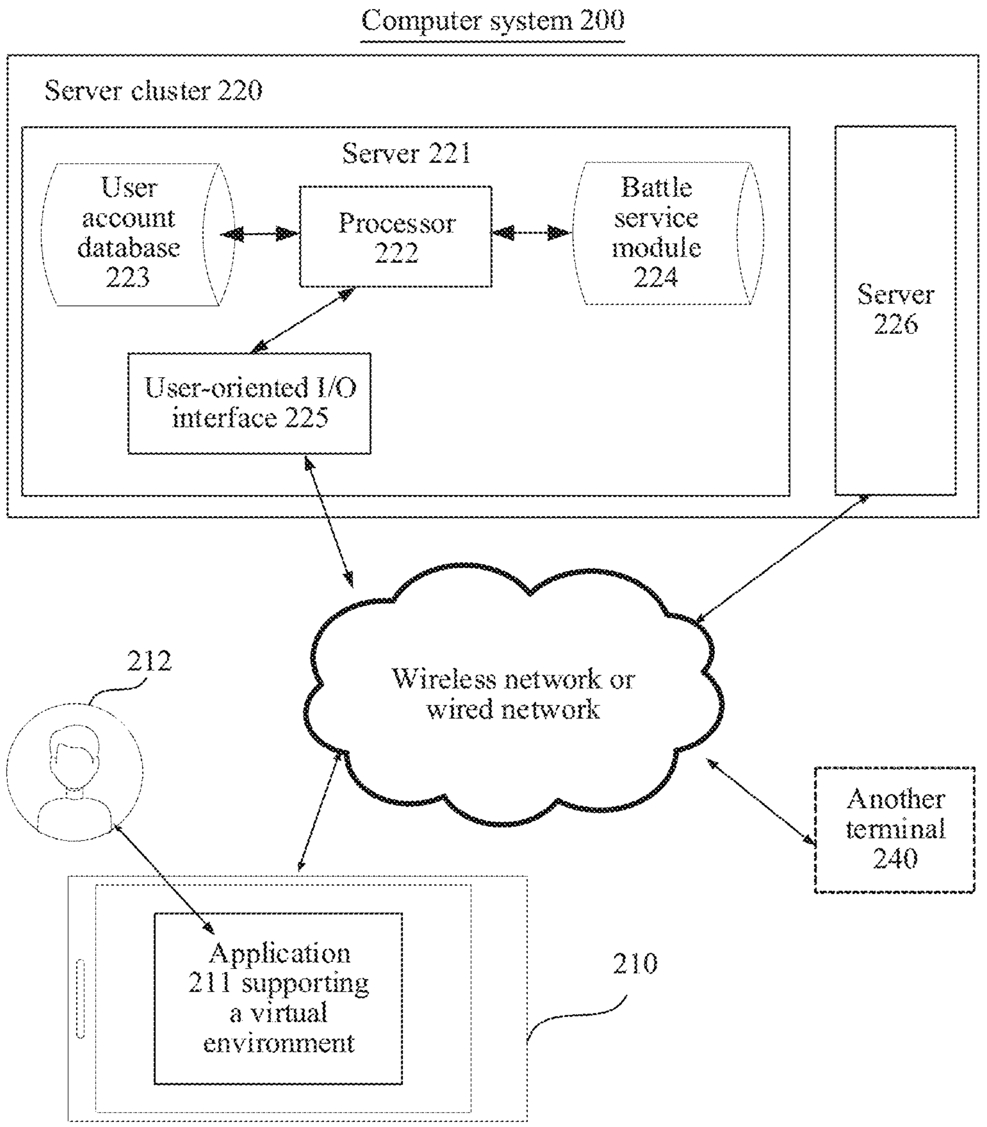
FIG. 2 is a structural block diagram of a computer system according to an exemplary embodiment of this application.

FIG. 2 shows a structural block diagram of a computer system according to an exemplary embodiment of this application. A computer system 200 includes: a terminal 210 and a server cluster 220.

A client 211 supporting a virtual environment is installed and running in the terminal 210, and the client 211 may be an application supporting the virtual environment. When the terminal runs the client 211, a user interface of the client 211 is displayed on a screen of the terminal 210. The client may be any one of an FPS game, a TPS game, a MOBA game, a sports game, or an SLG game. In this embodiment, an example in which the client is a racing game is used for description. The terminal 210 is a terminal used by a first user 212, who uses the terminal 210 to control a first virtual character located in a virtual environment to perform activities, and the first virtual character may be referred to as a first virtual character of the first user 212. The activities of the first virtual character include, but are not limited to: at least one of adjusting body attitude, crawling, walking, running, riding, flying jumping, driving, picking, shooting, attacking, and throwing. Schematically, the first virtual character is a first virtual character, for example, a simulated human character or an animated human character.

The device type of the terminal 210 includes: at least one of a smart phone, a tablet computer, an e-book reader, an MP3 player, an MP4 player, a laptop portable computer, or a desk computer.

FIG. 2 merely illustrates one terminal. However, a plurality of other terminals 240 may be present in different embodiments. In some embodiments, there is at least one other terminal 240 which is a terminal corresponding to a developer. A developing and editing platform of the client having a virtual environment is installed on the other terminal 240. The developer may edit and update the client on the other terminal 240, and transmit an updated client installation package to the server cluster 220 via a wired or wireless network. The terminal 210 may download the client installation package from the server cluster 220 to update the client.

The terminal 210 and the other terminal 240 are connected to the server cluster 220 via a wireless network or a wired network.

The server cluster 220 includes at least one of one server, a plurality of servers, a cloud computing platform, and a virtualization center. The server cluster 220 is configured to provide a backend service for a client supporting a three-dimensional virtual environment. In some embodiments, the server cluster 220 is responsible for primary computing work, and the terminals are responsible for secondary computing work; or the server cluster 220 is responsible for secondary computing work, and the terminals are responsible for primary computing work; or the server cluster 220 and the terminal perform collaborative computing by using a distributed computing architecture.

In some embodiments, the terminal and the server may both be computer devices.

In a schematic example, the server cluster 220 includes a server 221 and a server 226. The server 221 includes a processor 222, a user account database 223, a battle service module 224, or a user-oriented input/output interface (I/O interface) 225. The processor 222 is configured to load instructions stored in the server 221, and process data in the user account database 223 and the battle service module 224. The user account database 223 is configured to store data of user accounts used by the terminal 210 and the other terminal 240, for example, avatars of the user accounts, nicknames of the user accounts, battle effectiveness indexes of the user accounts, and service zones of the user accounts. The battle service module 224 is configured to provide a plurality of battle rooms for users to battle. The user-oriented I/O interface 225 is configured to establish communication with the terminal 210 via a wireless network or a wired network for data exchange.

In conjunction with the above description of the virtual environment and the implementation environment description, the virtual vehicle control method provided by the embodiments of this application is described below.

Schematically, the virtual vehicle control method provided by this application may be implemented by operation of a player on a terminal, and may also be implemented by operation of the player on a gamepad, a console, or the like connected to the terminal.

In a case of implementation by operation on a terminal, a plurality of control parts involved in the virtual vehicle control method provided by the embodiments of this application may each be implemented as a control in a display interface of the terminal. In the case of implementation by operation on a gamepad, a console, or the like connected to a terminal, a plurality of control parts involved in the virtual vehicle control method provided by the embodiments of this application may each be implemented as a specific component of the gamepad, the console, or the like. For example, a direction control part may be implemented as movement buttons and/or a joystick on the gamepad. For another example, an accelerator control part may be implemented as an accelerator pedal on the console, and the direction control part may be implemented as a steering wheel on the console.

Figure 3:
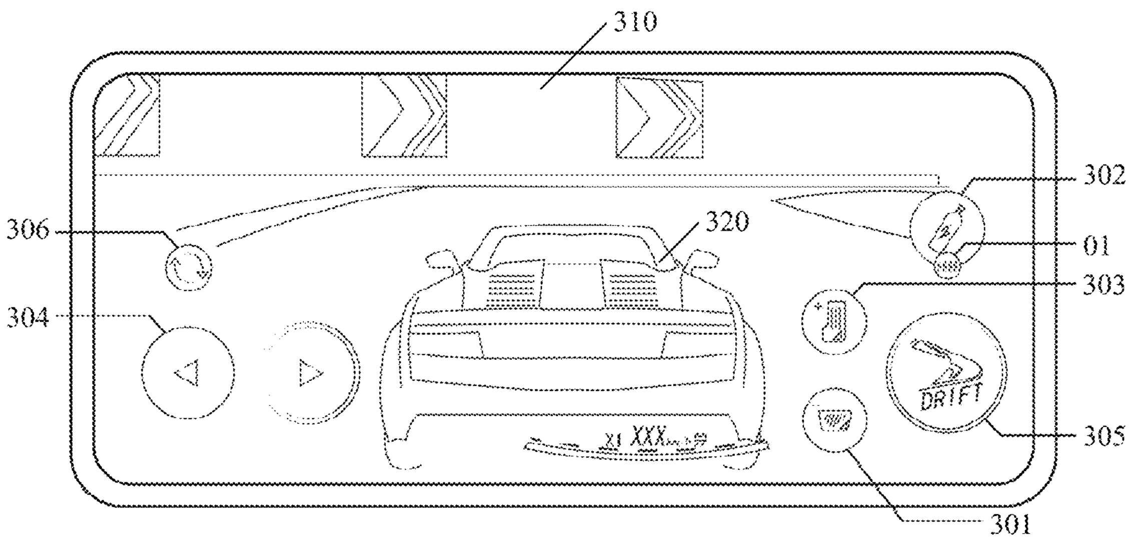
FIG. 3 is a schematic interface diagram of a virtual vehicle control method according to an exemplary embodiment of this application.

Taking a case in which the virtual vehicle control method provided by this application is implemented by operation of a player on a terminal as an example, FIG. 3 shows a schematic interface diagram of a virtual vehicle control method according to an exemplary embodiment of this application. A virtual vehicle 320 is displayed in a display interface 310, and the virtual vehicle 320 travels in a virtual scene displayed in the display interface 310.

Schematically, the display interface 310 includes at least one of the following controls: a brake control 301, an energy control 302, an accelerator control 303, a direction control 304, a handbrake control 305, or reset control 306. The controls are described as follows:

The brake control 301 is configured to realize control of grip of the virtual vehicle 320, and the grip of the virtual vehicle 320 refers to the friction between tires of the virtual vehicle 320 and the ground. In response to a trigger operation on the brake control 301, a vehicle speed of the virtual vehicle 320 is controlled to decrease.

The decrease in the vehicle speed of the virtual vehicle 320 is achieved by enhancing the grip of the virtual vehicle 320, and a decreasing amplitude of the vehicle speed of the virtual vehicle 320 may be set based on actual needs. Taking a player clicking/tapping on the brake control 301 as an example, in response to a single click/tap operation on the brake control 301, the friction between the tires of the virtual vehicle 320 and the ground increases, and the grip of the virtual vehicle is enhanced accordingly, so that the vehicle speed of the virtual vehicle 320 decreases accordingly.

An energy control 302 is configured to indicate a storage quantity of acceleration energy of the virtual vehicle 320. In response to a trigger operation on the energy control 302, one unit of acceleration energy is consumed to provide a speed-up service for the virtual vehicle 320. In some embodiments, a storage quantity control 01 of acceleration energy is displayed around the energy control 302, and the storage quantity control 01 is configured to indicate the storage quantity of acceleration energy corresponding to the virtual vehicle 320. In some embodiments, the storage quantity control 01 may be configured to indicate the number of units of acceleration energy possessed by the virtual vehicle 320. For example, when "3" is displayed at the storage quantity control 01, the virtual vehicle 320 possesses three units of acceleration energy. One unit is a numerically fixed dose, and may be described in terms of a container such as a bottle or a barrel having a fixed capacity. For example, one bottle of nitrogen may be understood as one unit of acceleration energy. The specific energy value of each unit of acceleration energy and/or an acceleration effect brought by each unit of acceleration energy to the virtual vehicle 320 may be set based on actual needs, which is not limited in this application.

Taking the acceleration energy being nitrogen as an example, the energy control 302 is configured to indicate a storage quantity of nitrogen that can be used to speed up the virtual vehicle 320. For example, the energy control 302 is configured to indicate a storage quantity of one bottle of nitrogen. The storage quantity control 01 is configured to indicate the number of nitrogen bottles corresponding to the virtual vehicle 320. In response to a trigger operation on the energy control 302, one bottle of nitrogen is consumed to provide an acceleration service for the virtual vehicle 320, and prompt information of consuming one bottle of nitrogen is displayed in the display interface 310.

The accelerator control 303 is configured to realize an increase in the vehicle speed of the virtual vehicle 320. In response to a trigger operation on the accelerator control 303, the virtual vehicle 320 is controlled to accelerate. The trigger operation on the accelerator control 303 may be at least one of a single click/tap operation, a double-click/tap operation, a touch operation, a press-and-hold operation, or the like. In the embodiments of this application, in response to the trigger operation on the accelerator control 303, a corresponding accelerator of the virtual vehicle 320 automatically remains pressed, so that the virtual vehicle 320 maintains a continuous accelerating state. If the player clicks/taps on the accelerator control 303 and then releases, the virtual vehicle 320 enters the continuous accelerating state. Alternatively, in response to a press-and-hold operation on the accelerator control 303, the corresponding accelerator of the virtual vehicle 320 remains depressed state, so that the virtual vehicle 320 maintains a continuous accelerating state. If the player presses and holds the accelerator control 303, the virtual vehicle 320 enters the continuous accelerating state. Furthermore, the player releases the accelerator control 303, and then the acceleration of the virtual vehicle 320 is stopped.

In some embodiments, the acceleration of virtual vehicle 320 is canceled in response to a cancel operation on the accelerator control 303. With reference to the foregoing example, the player clicks/taps on the accelerator control 303 and releases same, and the virtual vehicle 320 enters the continuous accelerating state. Subsequently, the player clicks/taps on the accelerator control 303 again, and the virtual vehicle 320 stops accelerating. The virtual vehicle 320 stopping acceleration may also be realized by other controls, such as the brake control 301 described above. In some embodiments, when the virtual vehicle 320 is in the continuous accelerating state, the brake control 301 is also configured for realizing at least one of an acceleration stop function, a deceleration function, or a reverse function of the virtual vehicle 320.

In some embodiments, after the virtual vehicle enters the continuous accelerating state, in response to a trigger operation on the brake control 301, the virtual vehicle 320 is controlled to stop acceleration, for simulating an accelerator rebound state. In a case that the trigger operation on the brake control 301 is a single click/tap operation, the virtual vehicle 320 is controlled to stop acceleration and enter a natural decelerating state. The natural decelerating state refers to the virtual vehicle 320 entering a continuous decelerating state due to a resistance factor, and the resistance factor includes at least one of road surface resistance, air resistance, and mechanical loss. In a case that the trigger operation on the brake control 301 is a press-and-hold operation, the virtual vehicle 320 is controlled to stop acceleration and enter a continuous decelerating state. The continuous decelerating state refers to the virtual vehicle 320 entering a continuous decelerating state due to a resistance factor and braking resistance, the resistance factor includes at least one of road surface resistance, air resistance, and mechanical loss, and the braking resistance is generated based on the press-and-hold operation on the brake control 301. The road surface resistance refers to the friction between tires of the virtual vehicle 320 and the ground. The air resistance refers to air resistance experienced by the virtual vehicle 320 during driving. The mechanical loss refers to kinetic energy loss in a transmission apparatus of the virtual vehicle 320. The magnitude of the braking resistance can be set based on actual needs. The natural decelerating state is related to a current vehicle speed, and the greater the current vehicle speed is, the greater the deceleration is. The deceleration speed is greater in the continuous decelerating state compared to that in the natural decelerating state. For example, taking an initial vehicle speed being 100 km/h as an example, it takes 60 seconds for the virtual vehicle 320 to decelerate to 0 km/h in the natural decelerating state, and only 2.5 seconds are needed in the continuous decelerating state. In some embodiments, when the virtual vehicle 320 is in the continuous decelerating state, if the vehicle speed of the virtual vehicle 320 decreases to 0 and the continuous pressing on the brake control 301 is still present, the virtual vehicle 320 is controlled to enter a reverse state.

The brake control 301 and the accelerator control 303 may not be used simultaneously.

The direction control 304 is configured to enable steering of the virtual vehicle 320. The direction control 304 may include a left steering control and a right steering control for enabling left and right steering of the virtual vehicle 320.

The handbrake control 305 is configured to enable braking of the virtual vehicle 320. In a forward drive state, in response to a trigger operation on the handbrake control 305, the vehicle speed of the virtual vehicle 320 is controlled to decrease. In some embodiments, the virtual vehicle 320 enters a drifting state in a curve in response to simultaneous trigger operations on the direction control 304 and the handbrake control 305. In some embodiments, in the drifting state, in response to a trigger operation on the handbrake control 305, the vehicle head of the virtual vehicle 320 turns inward, and a decrease in the vehicle speed of the virtual vehicle 320 is greater than a decrease in the vehicle speed of the virtual vehicle 320 in the forward drive state.

The reset control 306 is configured to enable restart of the virtual vehicle 320. In response to a trigger operation on the reset control 306, the virtual vehicle 320 is controlled to be displayed on an open road surface around, and the virtual vehicle 320 is controlled to be restarted. The reset control 306 is typically used in a detrapping process of the virtual vehicle 32.

Figure 4:
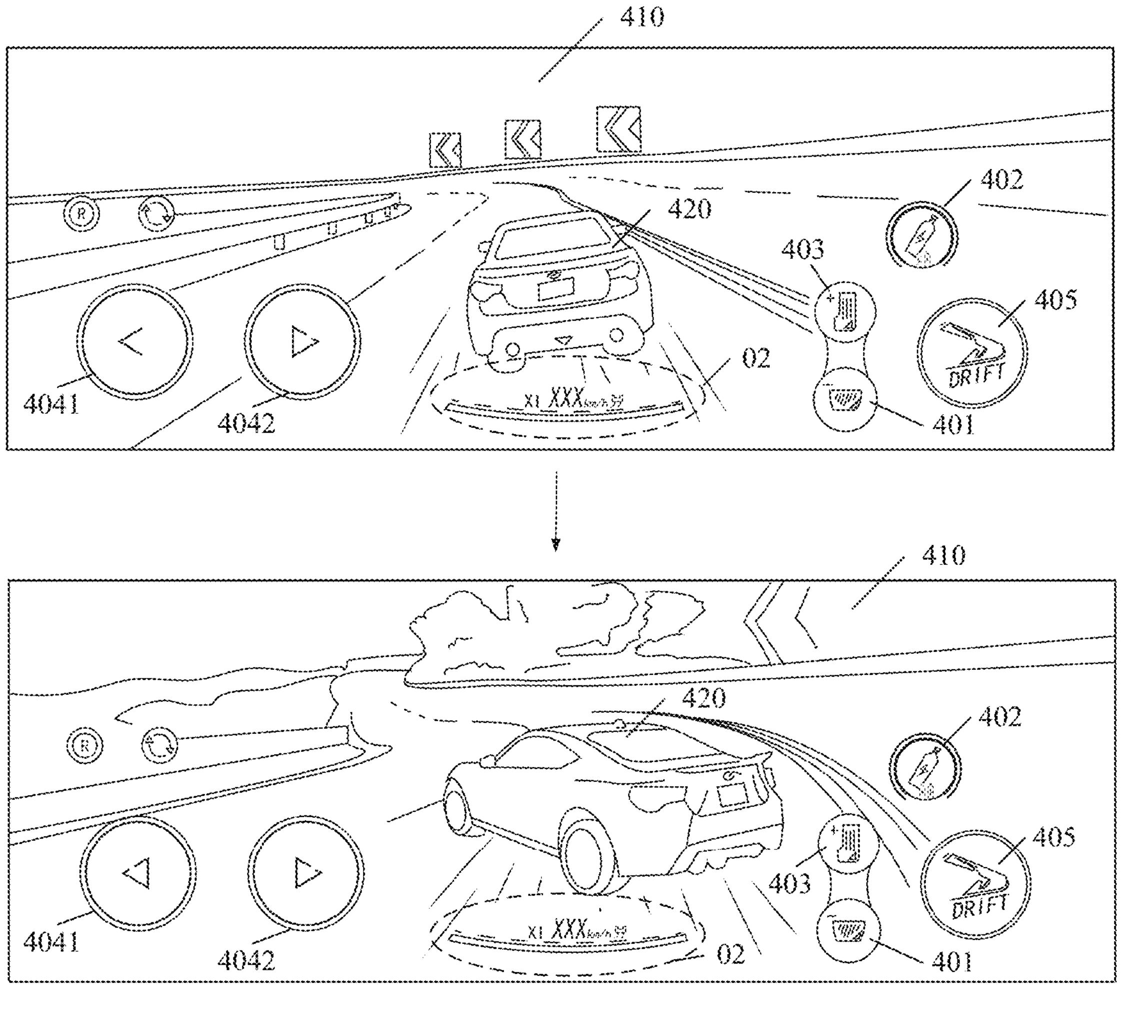
FIG. 4 is a schematic interface diagram of a virtual vehicle control method according to an exemplary embodiment of this application.

FIG. 4 is a schematic interface diagram of a virtual vehicle control method according to an exemplary embodiment of this application. Similar to FIG. 3, a virtual vehicle 420 is displayed in a display interface 410. The virtual vehicle 420 is in a drifting state in a curve. The drifting state may also be referred to as a spin state. In the drifting state, the virtual vehicle 420 travels sideslip in an over-steer mode. Any case in which the virtual vehicle 420 travels sideslip in the over-steer mode in the drifting state may be understood as the drifting state as referred to in this application. Moreover, the driving mode may be named using other nouns, and this is not limited in this application, and will not be repeated herein.

Schematically, the virtual vehicle control method provided by the embodiments of this application includes:

- controlling, in response to a first trigger operation on a brake control part, a vehicle speed of the virtual vehicle to decrease;
- displaying, in response to a second trigger operation on an energy control part, prompt information of consuming acceleration energy; and
- using a curve exit skill in response to a third trigger operation on an accelerator control part, to control the virtual vehicle to be in an accelerating state during a skill use period of the curve exit skill. The skill use period of the curve exit skill is configured for indicating accelerating duration of the virtual vehicle, and the skill use period of the curve exit skill is longer than accelerating duration of the virtual vehicle when the acceleration energy is used while the virtual vehicle is not in the drifting state.

Schematically, the virtual vehicle control method provided by the embodiments of this application is executed by a computer device. The computer device may be implemented as a terminal or as another device connected to a terminal. In some embodiments, the computer device is implemented as a terminal (for example, a mobile phone). The virtual vehicle control method provided by this application can be implemented by operation of a player on the terminal. In other embodiments, the computer device is implemented as a server connected to the terminal, and the virtual vehicle control method provided by this application may be implemented by operation of a player on a gamepad, a console, or the like connected to the terminal. The operation of the player on a gamepad, a console, or the like is uploaded to the server in a wired or wireless mode, and the server responds to the operation, and displays an operation result on a corresponding display device.

Taking a case that the virtual vehicle control method provided by this application is implemented by operation of a player on a terminal as an example, with reference to FIG. 4, the brake control part, the energy control part, and the accelerator control part may be displayed in the style of controls in the display interface 410. A brake control 401, an energy control 402, an accelerator control 403, and a left turn control 4041, a right turn control 4042, and a handbrake control 405 are displayed in the display interface 410, respectively.

Schematically, in response to a first trigger operation on the brake control 401, a decrease in the vehicle speed of the virtual vehicle 420 is displayed. A vehicle condition display area 02 is also displayed in the display interface 410, and the vehicle condition display area 02 is configured to display a drive state of the virtual vehicle 420, including at least numerical value information of the vehicle speed of the virtual vehicle 420 and/or a vehicle speed display bar. For example, the vehicle speed of the virtual vehicle 420 is displayed in the vehicle condition display area 02. At the same time, a progress bar (i.e., the aforementioned vehicle speed display bar) is displayed below the vehicle speed. The progress bar displays a different progress based on the magnitude of the vehicle speed, and the vehicle speed reaches the maximum at the full progress. The size of a display area of the progress bar varies along with the magnitude of the vehicle speed.

The first trigger operation may be at least one of the following: a single click/tap operation, a double-click/tap operation, a touch operation, a single press operation, and a press-and-hold operation. For example, the player clicks/taps on the brake control 401 to control the vehicle speed of the virtual vehicle 420 to decrease, the decrease in the numerical value of the vehicle speed of the virtual vehicle 420 is displayed in the vehicle condition display area 02, and the vehicle speed display bar is shortened.

In view of the foregoing description, the brake control 401 is configured to realize control of grip of the virtual vehicle 420. The grip of the virtual vehicle 420 refers to the friction between tires of the virtual vehicle 420 and the ground. The brake control 401 is configured to realize deceleration of the virtual vehicle 420, mainly by increasing the friction between the tires of the virtual vehicle 420 and the ground, which is shown as enhancement of the grip of the virtual vehicle 420.

With reference to FIG. 4, the virtual vehicle 420 is in a left-turning drifting state in a curve in a virtual scene. The two left wheels of the virtual vehicle 420 have higher friction with the ground and the two right wheels have less friction with the ground. At this time, the vehicle head direction and the speed direction of the virtual vehicle 420 are not the same direction, and there is an included angle between the vehicle head direction and the speed direction. The included angle may be referred to as a drift angle.

Subsequently, in response to the first trigger operation on the brake control 401, the friction of the wheels of the virtual vehicle 420 with the ground is increased, thus the grip of the virtual vehicle 420 is also enhanced, and a decrease in the vehicle speed of the virtual vehicle 420 is displayed in the display interface 410.

The virtual vehicle control method provided by the embodiments of this application is used for using a curve exit skill. In order to facilitate the use of the curve exit skill, to make the virtual vehicle 420 exit drifting in the drifting state in the curve and enter the forward drive state, it is necessary to enhance the grip of the virtual vehicle 420 before the curve exit skill is triggered, so that the virtual vehicle 420 can achieve faster drifting exit, faster acceleration, and longer acceleration in virtue of greater grip during a curve exit process, so that the travel track of the virtual vehicle 420 is more reasonable, and the speed-up effect of the virtual vehicle 420 is better.

By the first trigger operation on the brake control 401, a spin speed of the virtual vehicle 420 is increased, a sliding distance of the rear part of the virtual vehicle 420 is reduced, and the vehicle body of the virtual vehicle 420 is corrected quickly, so that the vehicle head direction and the speed direction of the virtual vehicle 420 are kept consistent as soon as possible. If the brake control 401 is not triggered, the grip of the virtual vehicle 420 is low, the length of time during which the vehicle head direction and the speed direction of the virtual vehicle 420 are restored to be consistent is relatively extended, so that the duration of the drifting state of the virtual vehicle 420 in the curve is also extended, resulting in a long curve exit process of the virtual vehicle 420. Moreover, the virtual vehicle 420 also decelerates continuously in the drifting state, and the vehicle speed of the virtual vehicle 420 is greatly decreased after the virtual vehicle 420 exits from the curve. At this time, the player can only accelerate the virtual vehicle 420 by triggering another control again.

Upon triggering the brake control 401, the grip of the virtual vehicle 420 is enhanced. Subsequently, in response to the second trigger operation on the energy control 402, prompt information of consuming acceleration energy is displayed. The acceleration energy is configured for providing an acceleration service for the virtual vehicle 420, and the prompt information of consuming the acceleration energy may be at least one of a text special effect, an animation special effect, or a sound special effect.

Taking the acceleration energy being nitrogen as an example, in response to the second trigger operation on the energy control 402, one bottle of nitrogen is consumed to provide the acceleration service for the virtual vehicle 420, while the prompt information of consuming the acceleration energy is displayed in the display interface 410. The prompt information may be at least one of a text special effect, a highlight special effect, a flash special effect, an aperture special effect, or a sound special effect. For example, after the player clicks/taps on the energy control 402, prompt text of "Nitrogen Bottle-1" is displayed in an information bar or the display interface 410. Alternatively, a flash special effect is displayed around the energy control 402, and the quantity displayed in a storage quantity control (not shown, refer to FIG. 3) is decremented by one.

In some embodiments, the prompt information may be displayed around the energy control 402. For example, the prompt information is an aperture special effect on the energy control 402. In response to the second trigger operation on the energy control 402, the aperture special effect is displayed on the energy control 402 for prompting consumption of one unit of acceleration energy to provide the acceleration service for the virtual vehicle 420.

The second trigger operation is at least one of the following: a single click/tap operation, a double-click/tap operation, a touch operation, a single press operation, and a press-and-hold operation. For example, a player clicks/taps on the energy control 402, and prompt information of consuming acceleration energy is displayed.

Schematically, in a process of consuming acceleration energy, in response to the third trigger operation on the accelerator control 403, the curve exit skill is used, to control the virtual vehicle 420 to be in an accelerating state in the skill use period of the curve exit skill. The skill use period of the curve exit skill is configured for indicating accelerating duration of the virtual vehicle 420, and the skill use period of the curve exit skill is longer than accelerating duration of the virtual vehicle 420 when the acceleration energy is used while the virtual vehicle is not in the drifting state.

Schematically, the player triggers the energy control 402, and the trigger moment is the starting moment of a preparation period of consuming one unit of acceleration energy to provide the acceleration service for the virtual vehicle 420. Before the end moment of the preparation period, if the player triggers the accelerator control 403, the curve exit skill is displayed, and the virtual vehicle 420 is controlled to be in an accelerating state in the skill use period of the curve exit skill.

Taking the acceleration energy being nitrogen as an example, the preparation period can be understood as a nitrogen filling period during which nitrogen enters an engine and fills the engine, and the nitrogen filling period can be set based on actual needs. For example, the nitrogen filling period lasts for 0.3-1 seconds. In the nitrogen filling period, if a player triggers the accelerator control 403, the curve exit skill is used to control the virtual vehicle 420 to be in an accelerating state in the skill use period of the curve exit skill. If the accelerator control 403 is not triggered by the player, nitrogen is ejected after the nitrogen filling period ends, and the virtual vehicle 420 is controlled to accelerate in an initially set mode. The initially set mode is set based on actual needs, but a gain brought by the traveling should be less than a gain under the curve exit skill.

In view of the foregoing description, the virtual vehicle 420 in the drifting state in the curve has a specific drift angle. The used curve exit skill is different based on a different drift angle, and the drifting-exit period is also different.

Schematically, the drifting exit is configured for instructing the virtual vehicle 420 to exit the drifting state and switch to another traveling state (such as a forward drive state), and the drifting-exit period is configured for indicating the duration used for the virtual vehicle 420 to exit the drifting state.

The virtual vehicle 420 has a plurality of traveling states, including, but not limited to, at least one of the following states: drifting state, forward drive state, reverse state. The drifting state refers to a traveling state in which an included angle between the speed direction of the virtual vehicle 420 and the vehicle head direction is not less than a preset value. The forward drive state refers to a traveling state in which the speed direction of the virtual vehicle 420 is kept consistent with the vehicle head direction, and the forward drive state may be one of the virtual vehicle 420 driving forward at a constant speed, driving forward with acceleration, driving forward with deceleration, and driving forward at a variable speed. The reverse state refers to a traveling state in which the speed direction of the virtual vehicle 420 is opposite to the vehicle head direction, and the reverse state may be one of the virtual vehicle 420 driving in a reverse direction at a constant speed, driving in a reverse direction with acceleration, driving in a reverse direction with deceleration, and driving in a reverse direction at a variable speed.

There is a case where the included angle between the speed direction of the virtual vehicle 420 and the vehicle head direction is less than the preset value, that is, there is a small deviation between the speed direction of the virtual vehicle and the vehicle head direction, and at this time, the virtual vehicle is still not considered to be in the drifting state, and is classified into the forward drive state or the reverse state. If the included angle between the speed direction of the virtual vehicle 420 and the vehicle head direction is 5 degrees, the virtual vehicle 420 may be considered to be in the forward drive state.

In some embodiments, in the case that the drift angle of the virtual vehicle 420 is not greater than a first angle, in response to the third trigger operation on the accelerator control 403, the first curve exit skill is used, to control the virtual vehicle 420 to be in the accelerating state during a skill use period of the first curve exit skill, and exits the drifting state after a first drifting-exit period.

In a case that the drift angle of the virtual vehicle 420 is greater than the first angle, in response to the third trigger operation on the accelerator control 403, the second curve exit skill is used, to control the virtual vehicle 420 to be in the accelerating state during a skill use period of the second curve exit skill, and exits the drifting state after a second drifting-exit period.

The first drifting-exit period is shorter than the second drifting-exit period, and the first angle can be set based on actual needs. In some embodiments, a value range of the first angle is 30-60 degrees, for example, the first angle may be 30, 35, 40, 45, 50, 55, or 60 degrees. Alternatively, in some embodiments, each drift angle of the virtual vehicle 420 corresponds to a drifting-exit period, such that the duration of the curve exit skill used in response to the third trigger operation on the accelerator control 403 is also different.

Schematically, the drift angle of the virtual vehicle 420 is configured for indicating the included angle between the vehicle head direction and the speed direction of the virtual vehicle 420. The greater the drift angle is, the greater a vehicle body deviation of the virtual vehicle 420 is, and the longer it will take to make the virtual vehicle 420 exit the drifting state. In view of this, a difference is present between the first drifting-exit period and the second drifting-exit period.

In some embodiments, before the curve exit skill is used, the drift angle of the virtual vehicle 420 is further required to be calculated. The drift angle is affected by the grip of the virtual vehicle 420. The virtual vehicle control method provided by the embodiments of this application further includes: determining the drift angle of the virtual vehicle 420 based on grip, a vehicle head direction, and a speed direction of the virtual vehicle 420.

The drift angle of the virtual vehicle 420 may be determined by following manners: determining, at an initial moment, a first difference value between the vehicle head direction and the speed direction as the drift angle; and determining, at a non-initial moment, the sum of the speed direction at the first moment and a product of the grip and a second difference value as the drift angle. The second difference value is configured for indicating a difference between the vehicle head direction at a second moment and the speed direction at a first moment. The second moment is later than the first moment.

Exemplarily, the iterative operation of the speed direction of the virtual vehicle 420 may be performed by using the following formulas:

$$v(t+\Delta t)=\text{grip}\times(d(t+\Delta t)-v(t))+v(t);$$

$$v(t+2\times\Delta t)=\text{grip}\times(d(t+2\times\Delta t)-v(t+\Delta t))+v(t+\Delta t);$$

$$\ldots$$

$$v(t+n\times\Delta t)=\text{grip}\times[d(t+n\times\Delta t)-v(t+(n-1)\times\Delta t)]+v(t+(n-1)\times\Delta t).$$

The speed direction of the virtual vehicle 420 at the initial moment t is v(t), the vehicle head direction at the initial moment t is d(t), and the unit time is Δt. The drift angle of the virtual vehicle 420 at the initial moment t is d(t)−v(t), the speed direction of the virtual vehicle 420 at the moment t+Δt is v(t+Δt), and the vehicle head direction of the virtual vehicle 420 at the moment t+Δt is d(t+Δt). Subsequently, the drift angle of the virtual vehicle 420 at the moment t+Δt may be calculated based on d(t+Δt)−v(t+Δt), and the remaining information can be calculated accordingly.

In some embodiments, the drift angle of the virtual vehicle at an $i^{th}$ moment is a difference between the vehicle head direction of the virtual vehicle at the $i^{th}$ moment and the speed direction of the virtual vehicle at the $i^{th}$ moment. For example, the virtual vehicle 420 has a drift angle d(t)−v(t) at the initial moment t.

In addition, the speed direction of the virtual vehicle at the second moment may be determined based on the grip, the vehicle head direction at the second moment, and the speed direction at the first moment. The second moment is a moment after the unit time has elapsed from the first moment, the vehicle head direction of the virtual vehicle at the second moment is the sum of the vehicle head direction of the virtual vehicle at the first moment and a turning angle of the virtual vehicle in the unit time.

Exemplarily, the speed direction of the virtual vehicle at the second moment is calculated by multiplying the difference between the vehicle head direction at the second moment and the speed direction at the first moment by the grip, and then adding the product with the speed direction at the first moment. For example, the speed direction of the virtual vehicle 420 at the moment $t+\Delta t$ is $v(t+\Delta t)$, which can be calculated based on $v(t+\Delta t)=grip\times(d(t+\Delta t)-v(t))+v(t)$.

In some embodiments, the unit time $\Delta t$ may be calculated in units of one frame, and the grip is a fixed function.

Exemplarily, assuming that the grip of the virtual vehicle 420 is constant at 0.5, the starting direction of the vehicle head direction of the virtual vehicle 420 is towards the front, and setting $d(t)=90°$, and the starting speed direction $v(t)$ of the virtual vehicle 420=15°, the drift angle of the virtual vehicle 420 at moment t (which is the starting moment) is $90°-15°=75°$. Subsequently, the vehicle head direction of the virtual vehicle 420 turns left by 15° within the time $\Delta t$, i.e., $d(t+\Delta t)=105°$.

Based on the above formula, assuming that $\Delta t=1$, the speed direction of the virtual vehicle 420 can be calculated based on the above formula as $v(t+\Delta t)=0.5\times(105°-15°)+15°=60°$, and the drift angle of the virtual vehicle 420 at the moment $t+\Delta t$ is $105°-60°=45°$.

By the first trigger operation on the brake control 401, a portion of the numerical value may be superimposed on the grip at the time of calculating the drift angle, so that a change in the speed direction of the virtual vehicle 420 is further accelerated, thus the duration required for the virtual vehicle 420 to switch from the drifting state to completing drifting exit is shortened, the purpose of rapid drifting exit is achieved, and the decrease in the vehicle speed of the virtual vehicle 420 is reduced.

For example, after the brake control 401 is triggered, the grip of the virtual vehicle 420 becomes 0.8, and the vehicle head direction of the virtual vehicle 420 turns left by 15° within the time $\Delta t$, assuming $\Delta t=1$. Based on the above formula, the speed direction of the virtual vehicle 420 is calculated as $v\ (t+\Delta t)=0.8\times(105°-15°)+15°=87°$, and the drift angle of the virtual vehicle 420 at the moment $t+\Delta t$ is $105°-87°=18°$.

Based on the above comparison, it is obvious that: in a case where the grip is changed, the change in the speed direction of the virtual vehicle 420 is further accelerated, thereby shortening the time required for the virtual vehicle 420 to switch from the drifting state to completing drifting exit, for the purpose of rapid drifting exit.

In some embodiments, in a case where the included angle between the vehicle head direction and the speed direction of the virtual vehicle 420 is less than a drifting-exit angle, it is determined that the virtual vehicle 420 completes drifting exit, and then the virtual vehicle 420 is controlled to enter a forward drive state. The drifting-exit angle can be set based on actual needs, for example, the drifting-exit angle is 13 degrees.

Schematically, the third trigger operation may be at least one of the following: a single click/tap operation, a double-click/tap operation, a touch operation, a single press operation, and a press-and-hold operation. For example, the player clicks/taps on the accelerator control 403 to use the curve exit skill, to control the virtual vehicle 420 to be in the accelerating state in the skill use period of the curve exit skill.

The curve exit skill is configured for indicating a skill of controlling the virtual vehicle 420 to exit from the curve. The curve is one type of virtual lanes displayed in the virtual interface, and may be implemented as a segment of a virtual road or as a curved path enclosed by a virtual obstacle. In view of this, the virtual vehicle 420 exiting from the curve may involve a variety of changes in traveling speed, vehicle head direction, speed direction, or the like, and the specific implementation of various curve exit skills may be refined based on the various changes. For example, the curve exit skill includes a first curve exit skill and a second curve exit skill, which curve exit skill is triggered is determined based on the difference in the included angle between the vehicle head direction and the speed direction (i.e., the drift angle) of the virtual vehicle 420.

In the virtual vehicle control method provided by the embodiments of this application, based on the difference in the specific operation of the third trigger operation, the use of other skills may also be triggered.

In some embodiments, the third trigger operation is a press-and-hold operation on the accelerator control 403, and when the press time on the accelerator control 403 exceeds first press duration, a full throttle skill is triggered, to extend the skill use period of the curve exit skill. Moreover, if the acceleration of the virtual vehicle 420 in this case does not reach the maximum value, the acceleration of the virtual vehicle 420 may further be increased so that the virtual vehicle 420 accelerates quickly under the full throttle skill.

The full throttle skill is configured for indicating a skill of increasing the acceleration of the virtual vehicle 420 to a maximum value, and may also be understood as a skill of adjusting the virtual engine of the virtual vehicle 420 to a maximum value. In some embodiments, the full throttle skill is configured for simulating pressing a virtual accelerator of the virtual vehicle 420 to an extreme position, thereby enabling quick acceleration. For a player, the use of the full throttle skill may enable the player to have a realistic experience of quickly increasing the vehicle speed of the virtual vehicle 420 to a maximum value.

In some embodiments, an energy overload skill is triggered in response to a fourth trigger operation on the energy control 402 within an energy trigger period after the curve exit skill is used, to extend the skill use period for the curve exit skill. Moreover, if the acceleration of the virtual vehicle 420 in this case does not reach the maximum value, the acceleration of the virtual vehicle 420 may also be increased so that the virtual vehicle 420 accelerates quickly under the energy overload skill.

The energy overload skill is configured for indicating a skill of extending the skill use period of the curve exit skill, and may also be understood as extending the accelerating duration of the virtual vehicle 420 when the virtual vehicle 420 exits the drifting state to another traveling state. Similar to the full throttle skill, the energy overload skill may also be configured for increasing the acceleration of the virtual vehicle 420 to a maximum value, or for adjusting a virtual engine of the virtual vehicle 420 to a maximum value, or for simulating pressing the virtual accelerator of the virtual vehicle 420 to a limit position, thereby enabling rapid acceleration. Similarly, for a player, triggering the energy overload skill within the energy trigger period after the curve exit skill is used may also enable the player to have a realistic experience of quickly increasing the vehicle speed of the virtual vehicle 420 to a maximum value.

In some embodiments, the energy control 402 is controlled to be in an unresponsive state after the energy trigger period is exceeded, and an end time point of the unresponsive state is identical to an end time point of the skill use period of the curve exit skill. That is, if within the energy trigger period, the player triggers the energy control 402 again, re-use of acceleration energy may be achieved to provide the acceleration service for the virtual vehicle 420 again, to meet the acceleration demand of the virtual vehicle 420 and extend the accelerating duration of the virtual vehicle 420. If after the energy trigger period, the player is not able to trigger the energy control 402 again, the player needs to wait for the end of the curve exit skill before triggering the energy control 402 again. The unresponsive state can be achieved in a variety of ways, for example, graying out the energy control 402.

The energy trigger period can be set based on actual needs, for example, the energy trigger period may be 0.3-1 second.

Taking the acceleration energy being nitrogen as an example, the player triggers the energy control 402 in the energy trigger period after the curve exit skill is used. In a case that the nitrogen storage quantity corresponding to the virtual vehicle 420 is not zero, one bottle of nitrogen is consumed again to accelerate the virtual vehicle 420, and the energy overload skill is triggered, to extend the skill use period of the curve exit skill. An operation solution in which a plurality of units of acceleration energy are consumed in a short time is provided, increasing the availability of acceleration energy.

In some embodiments, after each skill use, prompt information of successful skill use may be displayed in the display interface 410. The prompt information may be at least one of a text special effect, an animation special effect, or a sound special effect.

Alternatively, the virtual vehicle 420 being in the drifting state in a curve may be implemented by: controlling the virtual vehicle 420 to enter the drifting state in the curve in response to simultaneous trigger operations on the left turn control 4041 and the handbrake control 405.

Figure 5:
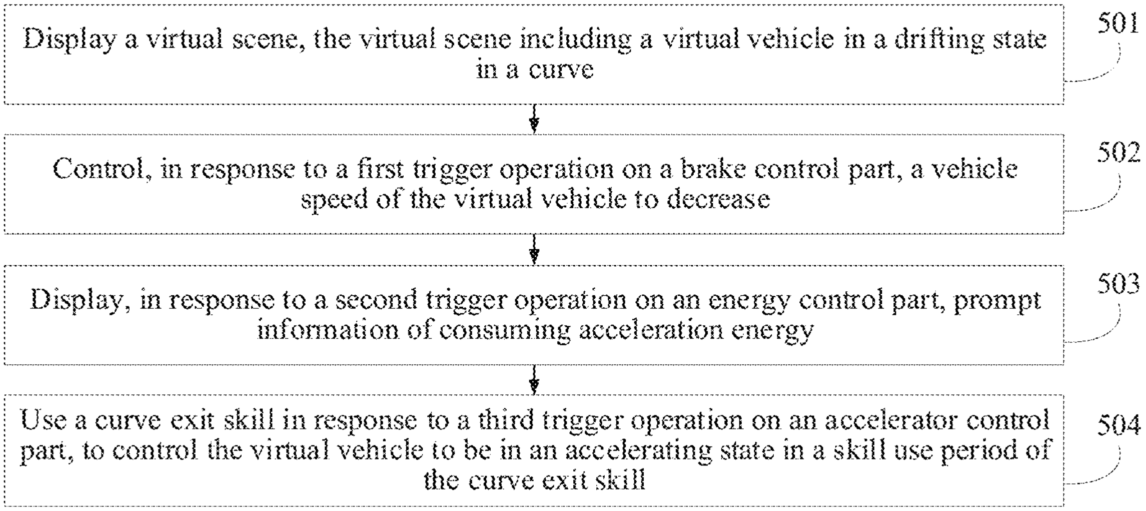
FIG. 5 is a flowchart of a virtual vehicle control method according to an exemplary embodiment of this application.

FIG. 5 is a flowchart of a virtual vehicle control method according to an exemplary embodiment of this application. The method is executed by a computer device. The computer device may be implemented as a terminal or as another device connected to a terminal. Please refer to the above content for details, which will not be repeated herein. Schematically, the method provided in the embodiments of this application further includes the following operations:

Operation 501: Display a virtual scene.

Schematically, a virtual vehicle in a drifting state in a curve is included in the virtual scene.

The drifting state may also be referred to as a spin state. In the drifting state, the virtual vehicle travels sideslip in an over-steer mode, so that the virtual vehicle can exit from the curve. Any case in which the virtual vehicle 420 travels sideslip in the over-steer mode in the drifting state may be understood as the drifting state as referred to in this application. Moreover, the driving mode may be named using other nouns, and this is not limited in this application, and will not be repeated herein.

In some embodiments, a virtual road and a virtual road sign may further be included in the virtual scene. The virtual vehicle travels on the virtual road, and a slow-down sign, a turn sign, or the like are displayed on both sides of the virtual road. The virtual vehicle is in a drifting state in a curve of the virtual road.

The virtual vehicle entering the drifting state may be achieved by simultaneous trigger operations on a direction control part and a handbrake control part. In some embodiments, the virtual vehicle control method provided by the embodiments of this application further includes:

controlling the virtual vehicle to enter the drifting state in the curve in response to simultaneous trigger operations on the direction control part and the handbrake control part.

The direction control part and the handbrake control part may be implemented as controls in a display interface of the terminal, or may be implemented as specific components of a gamepad or a console connected to the terminal. For example, the direction control part and the handbrake control part may respectively be implemented as a direction control and a handbrake control on the terminal. For another example, the direction control part may be implemented as a movement button or joystick on the gamepad, the handbrake control part may be implemented as a confirmation button on the gamepad. For another example, the direction control part and the handbrake control part may be implemented as a steering wheel and a brake handbrake on the console, respectively. An operation on the gamepad or the console may be uploaded to a server in a wired or wireless mode, and the server responds to the operation.

Operation 502: Control, in response to a first trigger operation on a brake control part, a vehicle speed of the virtual vehicle to decrease.

The brake control part may be implemented as a control in the display interface of the terminal or as a specific component of a gamepad or a console connected to the terminal. For example, the brake control part may be implemented as a brake control on the terminal. For another example, the brake control part may be implemented as a control button on the gamepad.

Schematically, the first trigger operation is at least one of the following: a single click/tap operation, a double-click/tap operation, a touch operation, a single press operation, and a press-and-hold operation. For example, a player clicks/taps on the brake control part to control the vehicle speed of the virtual vehicle to decrease.

In some embodiments, a vehicle condition display area is also displayed in the display interface where the virtual vehicle is located, the vehicle condition display area is configured to display a drive state of the virtual vehicle, including at least numerical value information of the vehicle speed of the virtual vehicle and/or a vehicle speed display bar. For example, in response to the first trigger operation on the brake control part, the vehicle speed of the virtual vehicle is controlled to decrease, the decrease in the numerical value of the vehicle speed of the virtual vehicle is displayed in the vehicle condition display area, and the vehicle speed display bar is shortened. For example, the vehicle speed of the virtual vehicle is displayed in the vehicle condition display area, and a progress bar is displayed below the vehicle speed. The size of the display area of the progress bar varies along with the magnitude of the vehicle speed.

In view of the foregoing description, the brake control part is configured to implement control on grip of the virtual vehicle. The grip of the virtual vehicle refers to the friction between tires of the virtual vehicle and the ground. In a case that the brake control part is triggered, the friction of the wheels of the virtual vehicle with the ground is increased, thus the grip of the virtual vehicle is also enhanced, and a decrease in the vehicle speed of the virtual vehicle is visually displayed.

In the embodiments of this application, the virtual vehicle control method is configured for using a curve exit skill, so that the virtual vehicle exits from a curve. In order to facilitate the use of the curve exit skill, it is necessary to enhance the grip of the virtual vehicle before the curve exit skill is triggered, so that the virtual vehicle can achieve faster drifting exit, faster acceleration, and longer acceleration in virtue of greater grip during a curve exit process, so that the travel track of the virtual vehicle is more reasonable, and the speed-up effect of the virtual vehicle is better.

By the first trigger operation on the brake control part, the spin speed of the virtual vehicle is increased, a sliding distance of the rear part of the virtual vehicle is reduced, and the vehicle body of the virtual vehicle is corrected quickly, so that the vehicle head direction and the speed direction of the virtual vehicle are kept consistent as soon as possible.

If the brake control part is not triggered, the grip of the virtual vehicle is low, the length of time during which the vehicle head direction and the speed direction of the virtual vehicle are restored to be consistent is relatively extended, so that the duration of the drifting state of the virtual vehicle in the curve is also extended, resulting in a long curve exit process of the virtual vehicle. Moreover, the virtual vehicle also decelerates continuously in the drifting state, and the vehicle speed of the virtual vehicle is greatly decreased after the virtual vehicle exits from the curve. At this time, the player can only accelerate the virtual vehicle by triggering another control part again.

Please refer to the above content for the detailed description of the effect of the grip on the curve exit skill, which will not be repeated herein.

Operation 503: Display, in response to a second trigger operation on an energy control part, prompt information of consuming acceleration energy.

Similar to the brake control part, the energy control part may be implemented as a control in the display interface of the terminal or as a specific component of a gamepad or a console connected to the terminal. For example, the energy control part may be implemented as an energy control on the terminal. For another example, the energy control part may be implemented as a confirmation button on the gamepad.

Schematically, the acceleration energy is configured for providing an acceleration service for the virtual vehicle, and the prompt information of consuming the acceleration energy may be at least one of a text special effect, an animation special effect, or a sound special effect.

Taking the acceleration energy being nitrogen as an example, in response to the second trigger operation on the energy control part, one bottle of nitrogen is consumed to provide the acceleration service for the virtual vehicle 420, while the prompt information of consuming the acceleration energy is displayed in the display interface. The prompt information may be at least one of a text special effect, a highlight special effect, a flash special effect, an aperture special effect, or a sound special effect.

In some embodiments, the prompt information may be displayed around the energy control part. For example, the prompt information is an aperture special effect on the energy control part. In response to the second trigger operation on the energy control part, the aperture special effect is displayed on the energy control part for prompting consumption of one unit of acceleration energy to provide the acceleration service for the virtual vehicle. Further, the sound special effect prompts the player that the consumption of the acceleration energy has been completed.

The second trigger operation may at least one of the following: a single click/tap operation, a double-click/tap operation, a touch operation, a single press operation, and a press-and-hold operation. For example, a player clicks/taps on the energy control part, and prompt information of consuming acceleration energy is displayed.

Operation 504: Use a curve exit skill in response to a third trigger operation on an accelerator control part, to control the virtual vehicle to be in an accelerating state during a skill use period of the curve exit skill.

In some embodiments, the skill use period of the curve exit skill is configured for indicating accelerating duration of the virtual vehicle, and the skill use period of the curve exit skill is longer than accelerating duration of the virtual vehicle when the acceleration energy is used while the virtual vehicle is not in the drifting state.

Based on operation 503, the consumption process of acceleration energy may be understood as a preparation process of consuming one unit of acceleration energy to provide the acceleration service for the virtual vehicle. The preparation process has a preparation period. In this process, the curve exit skill is used in response to the third trigger operation on the accelerator control part, such that the virtual vehicle is in the accelerating state in the skill use period. The trigger moment of the energy control part is the starting moment of the preparation period. The accelerator control part needs to be triggered before the consumption process of the acceleration energy ends (i.e., the end moment of the preparation period), so that the acceleration energy can provide a more efficient acceleration service for the virtual vehicle.

Taking the acceleration energy being nitrogen as an example, the preparation period can be understood as a nitrogen filling period during which nitrogen enters an engine and fills the engine, and the nitrogen filling period can be set based on actual needs. For example, the nitrogen filling period lasts for 0.3-1 seconds. In the nitrogen filling period, if a player triggers the accelerator control part, the curve exit skill is used to control the virtual vehicle to be in an accelerating state in the skill use period of the curve exit skill. If the accelerator control part is not triggered by the player, nitrogen is ejected after the nitrogen filling period ends, and the virtual vehicle is controlled to accelerate in an initially set mode. The acceleration of the virtual vehicle in the initially set mode is less than the acceleration of the virtual vehicle in the curve exit skill. That is, a gain brought by the initially set mode is less than a gain under the curve exit skill.

Similar to the brake control part and the energy control part, the accelerator control part may be implemented as a control in the display interface of the terminal or as a specific component of a gamepad or a console connected to the terminal. For example, the accelerator control part may be implemented as an accelerator control on the terminal. For another example, the accelerator control part may be implemented as a confirmation button on the gamepad. For another example, the accelerator control part may be implemented as an accelerator pedal on the console.

In some embodiments, after the execution of operation 504, after the skill use period of the curve exit skill ends, the acceleration of the virtual vehicle is controlled to be restored to a state before the curve exit skill is used.

In conclusion, in the virtual vehicle control method provided by the embodiments of this application, a curve exit skill is used by sequential trigger operations on a brake control part, an energy control part, and an accelerator control part to control a virtual vehicle to be in an accelerating state during a skill use period, thereby satisfying a speed-up requirement of the virtual vehicle during drifting of the virtual vehicle around a curve.

A first trigger operation on the brake control part is configured for enhancing grip of the virtual vehicle. In a case that the virtual vehicle has high grip, a spin speed of the virtual vehicle is increased, and the curve exit skill is used by a second trigger operation on the energy control part and a third trigger operation on the accelerator control part to achieve acceleration of the virtual vehicle, reducing a sliding distance of the rear part of the virtual vehicle, allowing the vehicle body of the virtual vehicle to be able to be corrected quickly, thereby making a travel track of the virtual vehicle in a curve exit process more reasonable, and achieving a better speed-up effect.

In view of the foregoing description, the virtual vehicle in the drifting state in the curve has a specific drift angle. The used curve exit skill is different based on a different drift angle.

Figure 6:
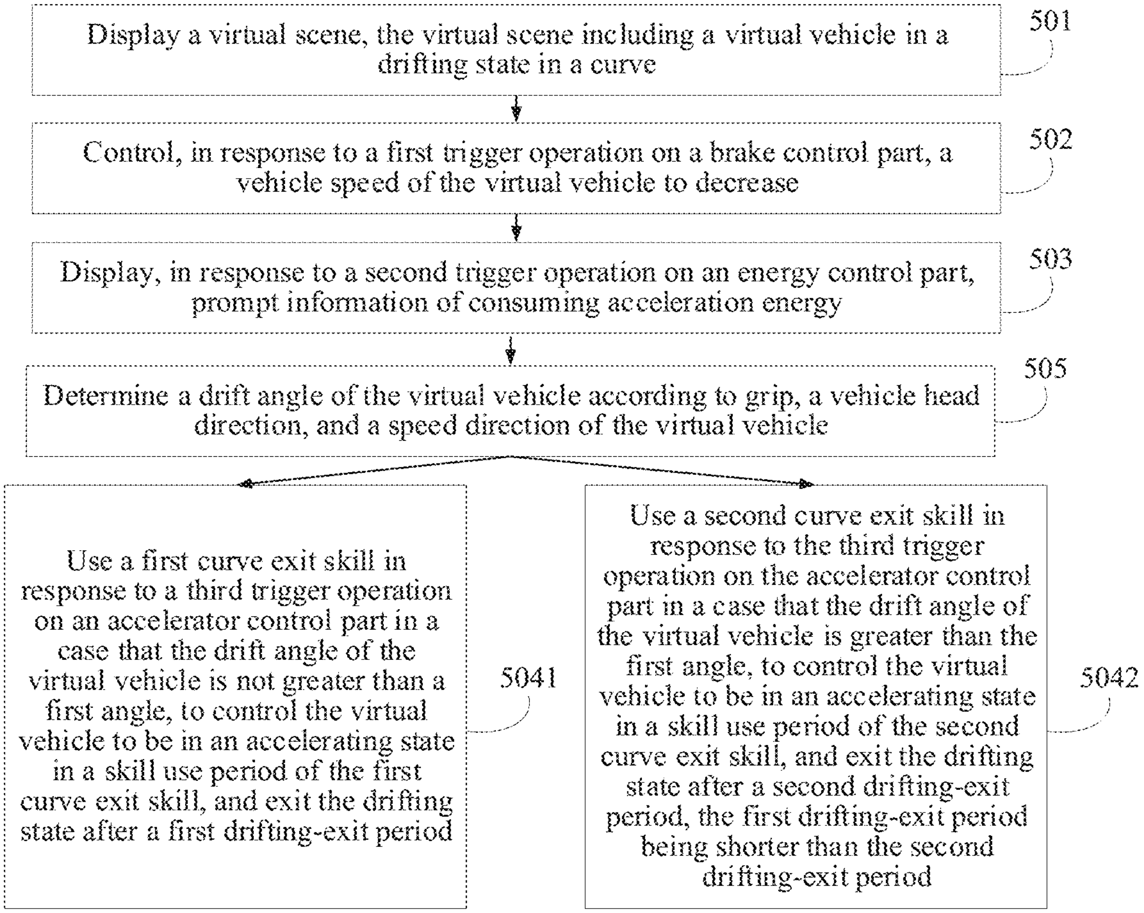
FIG. 6 is a flowchart of a virtual vehicle control method according to an exemplary embodiment of this application.

With reference to FIG. 5, FIG. 6 is a flowchart of a virtual vehicle control method according to an exemplary embodiment of this application. Operation 504 may be implemented as operation 5041 or operation 5042, for determining the used curve exit skill based on the difference between the drift angle and the first angle. Operation 505 may be present before operation 5041 or operation 5042, for determining the drift angle of the virtual vehicle before the curve exit skill is used. Operation 5041, operation 5042, and operation 505 are specifically as follows:

Operation 505: Determine the drift angle of the virtual vehicle based on grip, a vehicle head direction, and a speed direction of the virtual vehicle.

Schematically, the drift angle is configured for indicating the included angle between the vehicle head direction and the speed direction of the virtual vehicle.

The greater the drift angle is, the greater a vehicle body deviation of the virtual vehicle is, and the longer it will take to make the virtual vehicle exit the drifting state. In addition, the drift angle is affected by the grip of the virtual vehicle, and the change of the grip is implemented by the trigger operation on the brake control part.

In a case where the virtual vehicle is in a forward drive state, the speed direction of the virtual vehicle is substantially consistent with the vehicle head direction, and at this time, a moving angle of the virtual vehicle may be determined to be 0 degrees. In a case where the virtual vehicle is in a reverse state, the speed direction of the virtual vehicle is substantially opposite to the vehicle head direction, and at this time, the moving angle of the virtual vehicle may be determined to be 180 degrees. The virtual vehicle at either of the above two moving angles is not in the drifting state. In some embodiments, the virtual vehicle may still not be considered to be in the drifting state even if the moving angle of the virtual vehicle is not 0 or 180 degrees, such as 15 degrees or 170 degrees, or the like, that is, there is a small deviation between the speed direction and the vehicle head direction of the virtual vehicle (for example, a deviation of 30 degrees or less compared with 0/180 degrees).

In a case where the virtual vehicle is in the drifting state, the speed direction of the virtual vehicle is not consistent with the vehicle head direction. That is, the speed direction of the virtual vehicle is a first direction, the vehicle head direction is a second direction, the first direction and the second direction are different directions, a specific deviation angle is present between the first direction and the second direction, and the deviation angle is the drift angle. Similarly, due to the presence of the drift angle, the virtual vehicle is enabled to present a drifting attitude.

Schematically, a grip effect of the virtual vehicle may be achieved by stepwise rotation of the speed direction of the virtual vehicle toward the vehicle head direction, eventually causing the virtual vehicle to exit drifting and be restored to the forward drive state.

Figure 7:
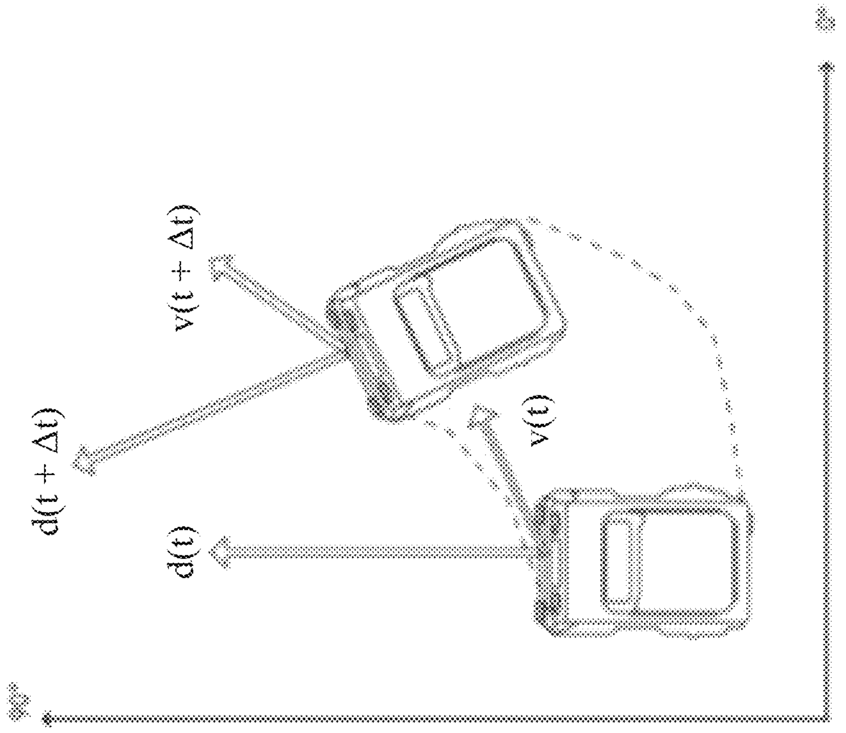
FIG. 7 is a schematic diagram of calculation of a drift angle according to an exemplary embodiment of this application.

The speed direction of the virtual vehicle at the initial moment t is v(t), the vehicle head direction at the initial moment t is d(t), and the unit time is Δt. FIG. 7 is a schematic diagram of calculation of a drift angle according to an exemplary embodiment of this application.

Exemplarily, the iterative operation of the speed direction of the virtual vehicle may be performed by using the following formulas:

$$v(t+\Delta t) = \text{grip}\times(d(t+\Delta t)-v(t))+v(t);$$

$$v(t+2\times\Delta t) = \text{grip}\times(d(t+2\times\Delta t)-v(t+\Delta t))+v(t+\Delta t);$$

$$\ldots$$

$$v(t+n\times\Delta t) = \text{grip}\times[d(t+n\times\Delta t)-v(t+(n-1)\times\Delta t)]+v(t+(n-1)\times\Delta t).$$

The speed direction of the virtual vehicle at the initial moment t is v(t), the vehicle head direction at the initial moment t is d(t), and the unit time is Δt. The drift angle of the virtual vehicle at the initial moment t is d(t)−v(t), the speed direction of the virtual vehicle 420 at the moment t+Δt is v(t+Δt), and the vehicle head direction of the virtual vehicle at the moment t+Δt is d(t+Δt). Subsequently, the drift angle of the virtual vehicle at the moment t+Δt may be calculated based on d(t+Δt)−v(t+Δt), and the remaining information can be calculated accordingly.

In some embodiments, the drift angle of the virtual vehicle at the $i^{th}$ moment is a difference between the vehicle head direction of the virtual vehicle at the $i^{th}$ moment and the speed direction of the virtual vehicle at the $i^{th}$ moment. For example, the virtual vehicle has a drift angle d(t)−v(t) at the initial moment t.

In addition, the speed direction of the virtual vehicle at the second moment may be determined based on the grip, the vehicle head direction at the second moment, and the speed direction at the first moment. The second moment is a moment after the unit time has elapsed from the first moment, the vehicle head direction of the virtual vehicle at the second moment is the sum of the vehicle head direction of the virtual vehicle at the first moment and a turning angle of the virtual vehicle in the unit time.

Exemplarily, the speed direction of the virtual vehicle at the second moment is calculated by multiplying the difference between the vehicle head direction at the second moment and the speed direction at the first moment by the grip, and then adding the product with the speed direction at the first moment. For example, the speed direction of the virtual vehicle at the moment t+Δt is v(t+Δt), which can be calculated based on v(t+Δt)=grip×(d(t+Δt)−v(t))+v(t).

In some embodiments, the unit time Δt may be calculated in units of one frame, and the grip is a fixed function.

Based on the formula above, the drift angle of the virtual vehicle at the initial moment t is d(t)−v(t), the speed direction of the virtual vehicle at the moment t+Δt is v(t+Δt), the vehicle head direction of the virtual vehicle at the moment t+Δt is d(t+Δt), and so on for remaining information.

The drift angle of the virtual vehicle at the initial moment t is d(t)−v(t), the speed direction of the virtual vehicle 420 at the moment t+Δt is v(t+Δt), and the drift angle of the virtual vehicle 420 at the moment t+Δt is d(t+Δt)−v(t+Δt).

With reference to FIG. 7, assuming that the grip of the virtual vehicle is constant at 0.5, the starting direction of the vehicle head direction of the virtual vehicle is towards the front, and setting d(t)=90°, and the starting speed direction v(t) of the virtual vehicle=15°, the drift angle of the virtual vehicle at moment t (which is the starting moment) is 90°−15°=75°. Subsequently, the vehicle head direction of the virtual vehicle turns left by 150 within the time Δt, i.e., d(t+Δt)=105°.

Based on the above formula, assuming that Δt=1, the speed direction of the virtual vehicle can be calculated based on the above formula as v(t+Δt)=0.5×(105°−15°)+15°=60°, and the drift angle of the virtual vehicle at the moment t+Δt is 105°−60°=45°. Similarly, the drift angle of the virtual vehicle at a next moment may be calculated iteratively based on the above formula.

In view of the foregoing description, by the first trigger operation on the brake control part, the grip of the virtual vehicle may be improved, thereby affecting a change in the drift angle of the virtual vehicle. The enhancement of the grip can accelerate the rate at which the drift angle decreases, thereby accelerating the drifting exit of the virtual vehicle from the drifting state to enter the forward drive state.

That is, by the first trigger operation on the brake control part, a portion of the numerical value may be superimposed on the grip at the time of calculating the drift angle, so that a change in the speed direction of the virtual vehicle is further accelerated, thus the duration required for the virtual vehicle to complete drifting exit is shortened, the purpose of rapid drifting exit is achieved, and the decrease in the vehicle speed of the virtual vehicle is reduced.

Figure 8:
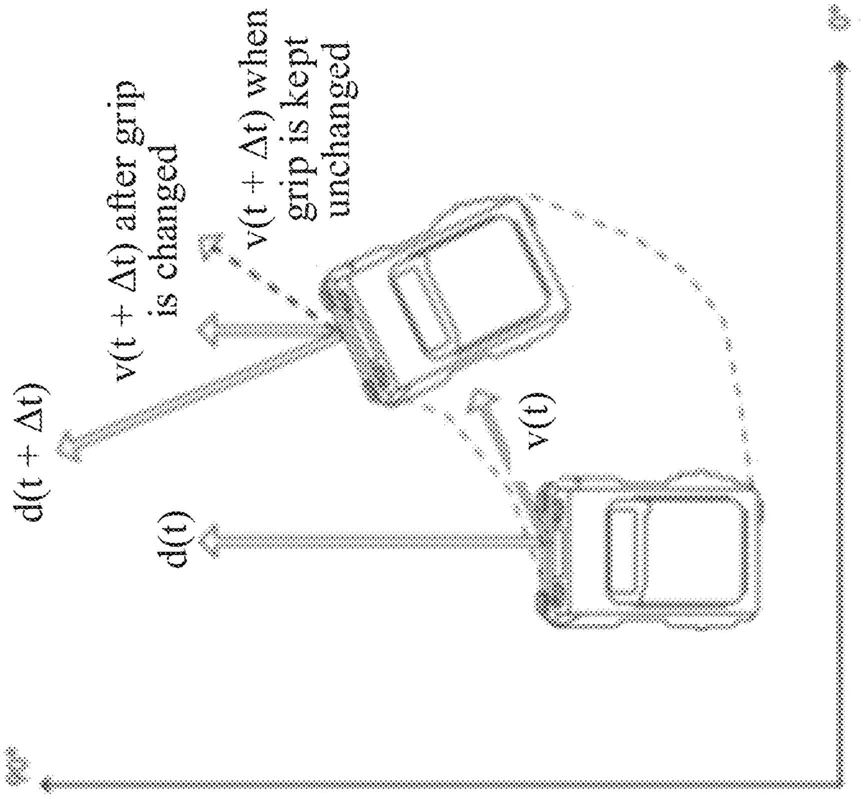
FIG. 8 is a schematic diagram of calculation of a drift angle according to an exemplary embodiment of this application.

With reference to FIG. 7, FIG. 8 is a schematic diagram of calculation of a drift angle according to an exemplary embodiment of this application. A case that the first trigger operation on the brake control part enables the grip to be enhanced from 0.5 to 0.8 is taken as an example.

After the brake control is triggered, the grip of the virtual vehicle becomes 0.8, and the vehicle head direction of the virtual vehicle 420 turns left by 15° within the time Δt, assuming Δt=1. Based on the above formula, the speed direction of the virtual vehicle is calculated as v (t+Δt)=0.8×(105°−15°)+15°=87°, and the drift angle of the virtual vehicle at the moment t+Δt is 105°−87°=18°. Similarly, the drift angle of the virtual vehicle at a next moment may be calculated iteratively based on the above formula.

Comparing FIG. 7 with FIG. 8, it is obvious that: in a case where the grip is changed, the change in the speed direction of the virtual vehicle is further accelerated, thereby shortening the time required for the virtual vehicle to complete drifting exit, for the purpose of rapid drifting exit. Therefore, in a skill trigger period of the curve exit skill, the duration for exiting from a curve is shortened, and more time is left for acceleration, thereby relatively providing power for the virtual vehicle to increase the vehicle speed of the virtual vehicle.

Moreover, the drifting-exit period of the virtual vehicle is affected by the drift angle, and the greater the drift angle is, the longer the duration it takes for the virtual vehicle to exit drifting.

In some embodiments, the virtual vehicle control method provided by the embodiments of this application further includes:

controlling the virtual vehicle to enter a forward drive state when an included angle between the vehicle head direction and the speed direction of the virtual vehicle is less than a drifting-exit angle.

The drifting-exit angle can be set based on actual needs. In some embodiments, a value range of the drifting-exit angle is 10-20 degrees, for example, the drifting-exit angle may be 13 degrees.

With reference to FIG. 8 and the foregoing, the drifting-exit angle being 13 degrees is taken as an example.

In a case that the grip is 0.5, the drift angle of the virtual vehicle at the moment t+Δt is calculated to be 45°. Because the drift angle at this moment is greater than the drifting-exit angle, the virtual vehicle is still in the drifting state, and a next iteration is needed.

In a case that the grip is 0.8, the drift angle of the virtual vehicle at the moment t+Δt is calculated to be 18°. Because the drift angle at this moment is greater than the drifting-exit angle, the virtual vehicle is still in the drifting state, and a next iteration is still needed.

In the case where the grip is 0.8, the drift angle of the virtual vehicle is already extremely close to the drifting-exit angle, and it is highly possible that a drift angle less than the drifting-exit angle may be obtained in the next iteration, and the virtual vehicle exit drifting at the next moment. In the case that the grip is 0.5, the drift angle of the virtual vehicle is still at a large distance from the drifting-exit angle, and it may take a number of iterations to obtain a drift angle less than the drifting-exit angle. That is, the moment when the virtual vehicle exist drifting is necessarily later than that in the case that the virtual vehicle in the case that the grip is 0.8.

Based on operation 505, the drift angle of the virtual vehicle is determined based on the grip, the vehicle head direction, and the speed direction of the virtual vehicle, in order to determine that the curve exit skill needs to be used.

Operation 5041: Use a first curve exit skill in response to the third trigger operation on the accelerator control part when the drift angle of the virtual vehicle is not greater than a first angle, to control the virtual vehicle to be in the accelerating state during a skill use period of the first curve exit skill, and exit the drifting state after a first drifting-exit period.

Operation 5042: Use a second curve exit skill in response to the third trigger operation on the accelerator control part when the drift angle of the virtual vehicle is greater than the first angle, to control the virtual vehicle to be in the accelerating state during a skill use period of the second curve exit skill, and exit the drifting state after a second drifting-exit period.

Schematically, the first drifting-exit period is shorter than the second drifting-exit period.

The first angle can be set based on actual needs. In some embodiments, a value range of the first angle is 30-60 degrees, for example, the first angle may be 30, 35, 40, 45, 50, 55, or 60 degrees.

In view of the foregoing description, the drifting-exit period of the virtual vehicle is affected by the drift angle, and the greater the drift angle is, the longer the duration it takes for the virtual vehicle to exit drifting. Please refer to related descriptions of operation 505 for the calculation mode for a drift angle of a virtual vehicle in a real-time state, which will not be repeated herein. In order to enrich the use process of the curve exit skill of the virtual vehicle, different curve exit skills may be used based on different choices in the drift angle. In some embodiments, based on operation 5041 or operation 5042, if the drift angle of the virtual vehicle is not greater than the first angle, the first curve exit skill is used to control the virtual vehicle to exit the drifting state after a shorter drifting-exit period. If the drift angle of the virtual vehicle is greater than the first angle, the second curve exit skill is used to control the virtual vehicle to exit the drifting state after a longer drifting-exit period.

Moreover, the skill use period of the first curve exit skill and the skill use period of the second curve exit skill may be the same or different, which is not limited in this application. The specific duration of the skill use period of the first curve exit skill and the specific duration of the skill use period of the second curve exit skill may be set based on actual needs.

Under the first curve exit skill, the virtual vehicle exits the drifting state after the first drifting-exit period, and at this time, there is still an accelerating period (i.e., the period obtained by subtracting the first drifting-exit period from the skill use period of the first curve exit skill), and the virtual vehicle is still in an accelerating state. Similarly, under the second curve exit skill, the virtual vehicle exits the drifting state after the second drifting-exit period, and at this time, there is still an accelerating period (i.e., the period obtained by subtracting the second drifting-exit period from the skill use period of the second curve exit skill), and the virtual vehicle is still in an accelerating state.

Taking a case that the skill use period of the first curve exit skill and the skill use period of the second curve exit skill are the same as an example, the accelerating durations corresponding to the first curve exit skill and the second curve exit skill are different, and the accelerating duration corresponding to the first curve exit skill is longer than the accelerating duration corresponding to the second curve exit skill.

In some other embodiments, after the virtual vehicle enters the drifting state, each drift angle corresponds to a drifting-exit period. At this moment, operation 504 may be implemented as follows: using a corresponding curve exit skill based on the drift angle of the virtual vehicle in response to the third trigger operation on the accelerator control part, to control the virtual vehicle to be in the accelerating state during a skill use period of the curve exit skill, and exiting the drifting state after a specified drifting-exit period. The specified drifting-exit period corresponds to the drift angle of the virtual vehicle.

For example, a drift angle corresponds to a specified drifting-exit period, and the greater the drift angle is, the shorter the specified drifting-exit period is. For example, a drift angle of 30 degrees corresponds to a first specified drifting-exit period, a drift angle of 50 degrees corresponds to a second specified drifting-exit period, and the first specified drifting-exit period is shorter than the second specified drifting-exit period. As another example, one drift angle interval corresponds to one specified drifting-exit period, and the drift angle intervals may be set based on actual requirements. For example, a drift angle interval of 30-40 degrees corresponds to a first specified drifting-exit period, a drift angle of 40-50 degrees corresponds to a second specified drifting-exit period, and the first specified drifting-exit period is shorter than the second specified drifting-exit period.

Figure 9:
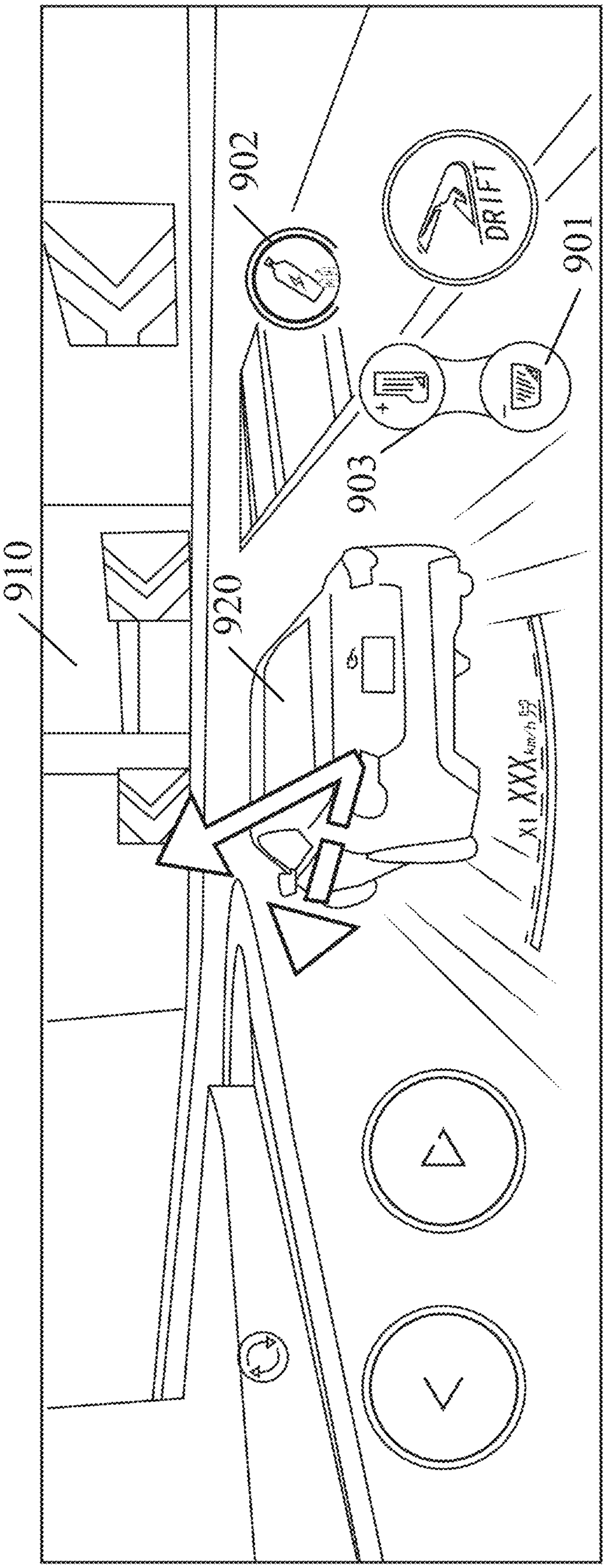
FIG. 9 is a schematic interface diagram of a virtual vehicle control method according to an exemplary embodiment of this application.

FIG. 9 is a schematic interface diagram of a virtual vehicle control method according to an exemplary embodiment of this application. The brake control part, the energy control part, and the accelerator control part may be displayed in the style of controls in the display interface 910. A brake control 901 (i.e., the brake control part above), an energy control 902 (i.e., the energy control part above), and an accelerator control 903 (i.e., the accelerator control part above) are respectively displayed in the display interface 910.

Schematically, in response to a first trigger operation on the brake control 901, a decrease in the vehicle speed of the virtual vehicle 920 is displayed, and grip of the virtual vehicle 920 is enhanced. Subsequently, in response to the second trigger operation on the energy control 902, prompt information of consuming acceleration energy is displayed. In a process of consuming acceleration energy, in response to the third trigger operation on the accelerator control 903, the curve exit skill is used, to control the virtual vehicle 920 to be in an accelerating state in the skill use period of the curve exit skill.

In view of the foregoing description, different curve exit skills may be used based on different drift angles of the virtual vehicle 920. The drift angle of the virtual vehicle 920 may be represented by an included angle constituted by arrows shown in FIG. 9. A solid arrow is configured for indicating the vehicle head direction, and a dashed arrow is configured for indicating the speed direction.

Taking the first angle being 45 degrees as an example, in the case that the drift angle of the virtual vehicle is not greater than 45 degrees, in response to the third trigger operation on the accelerator control 903, the first curve exit skill is used, to control the virtual vehicle 920 to be in the accelerating state during a skill use period of the first curve exit skill, and exits the drifting state after a first drifting-exit period. In a case that the drift angle of the virtual vehicle is greater than 45 degrees, in response to the third trigger operation on the accelerator control 903, the second curve exit skill is used, to control the virtual vehicle 920 to be in the accelerating state during a skill use period of the second curve exit skill, and exits the drifting state after a second drifting-exit period. The first drifting-exit period is shorter than the second drifting-exit period.

Exemplarily, the first curve exit skill may also be referred to as a boost curve exit skill and the second curve exit skill may also be referred to as a boost skill.

Figure 10:
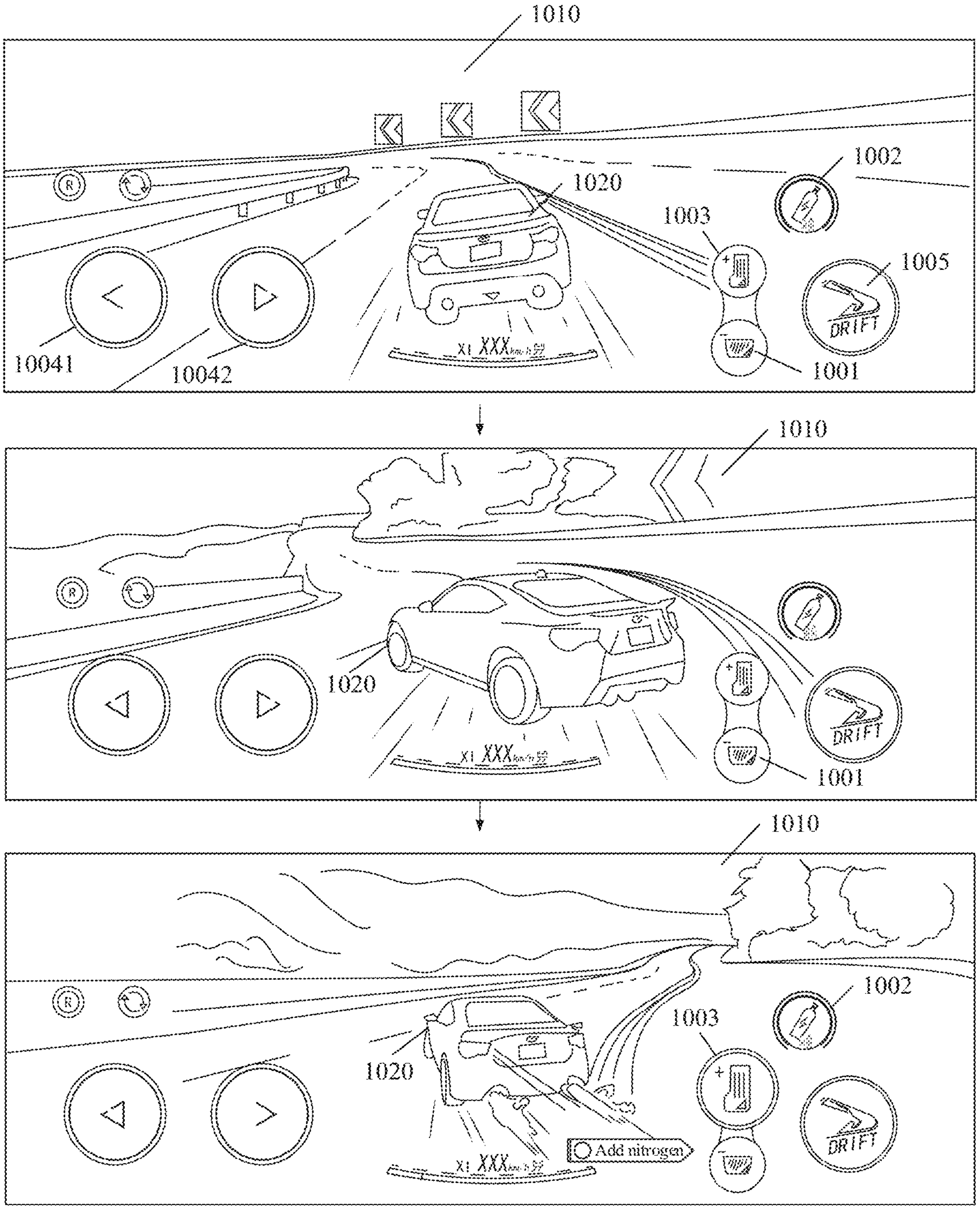
FIG. 10 is a schematic interface diagram of a virtual vehicle control method according to an exemplary embodiment of this application.

FIG. 10 is a schematic interface diagram of a virtual vehicle control method according to an exemplary embodiment of this application. The brake control part, the energy control part, and the accelerator control part may be displayed in the style of controls in the display interface 1010. A brake control 1001, an energy control 1002, an accelerator control 1003, and a left turn control 10041, a right turn control 10042, and a handbrake control 1005 are displayed in the display interface 1010, respectively.

Exemplarily, the virtual vehicle 1020 is controlled to enter the drifting state in the curve in response to simultaneous trigger operations on the left turn control 10041 and the handbrake control 1005.

Subsequently, in response to a first trigger operation on the brake control 1001, a decrease in the vehicle speed of the virtual vehicle 1020 is displayed, and grip of the virtual vehicle 1020 is enhanced. In response to the second trigger operation on the energy control 1002, prompt information of consuming acceleration energy is displayed. In a process of consuming acceleration energy, in response to the third trigger operation on the accelerator control 1003, the curve exit skill is used, to control the virtual vehicle 1020 to be in an accelerating state in the skill use period of the curve exit skill. The curve exit skill may be determined based on a difference in the drift angle of the virtual vehicle 1020. Please refer to the above content for details, which will not be repeated herein.

Taking the acceleration energy being nitrogen as an example, in response to a second trigger operation on the energy control 1002, one bottle of nitrogen is consumed to provide an acceleration service for the virtual vehicle 1020. Subsequently, in response to a third trigger operation on the accelerator control 1003, the first or second curve exit skill is used based on the drift angle of the virtual vehicle 1020 to extend the duration of acceleration of the virtual vehicle 1020.

A difference is present between the first drifting-exit period and the second drifting-exit period. In view of the foregoing description, the virtual vehicle 1020 has a drift angle. The greater the drift angle is, the greater a vehicle body deviation of the virtual vehicle 1020 is, and the longer it will take to make the virtual vehicle 1020 exit the drifting state.

In conclusion, in the virtual vehicle control method provided by the embodiments of this application, in response to the third trigger operation on the accelerator control part, different curve exit skills can be used when the virtual vehicle has different drift angles, so that the curve exit process of the virtual vehicle more tends to an actual situation. Based on the different drift angles of the virtual vehicle, the corresponding drifting-exit periods are also different, and the larger the drift angle is, the longer the drifting-exit period is.

In some embodiments, in order to determine a specific used curve exit skill, in the method provided by this application, the drift angle is further determined based on grip, a vehicle head direction, and a speed direction of the virtual vehicle. The grip is affected by the first trigger operation on the brake control part, and thus the drift angle is further affected. In view of this, by the first trigger operation, the magnitude of the grip can be changed. Based on the magnitude of the changed grip, combined with the real-time vehicle head direction and speed direction, the drift angle of the virtual vehicle may be determined. Then, based on the comparison between the drift angle and the first angle, which kind of curve exit skill is used is determined, and the drifting-exit period of the virtual vehicle may be determined, thereby making the control of the virtual vehicle more realistic.

Figure 11:
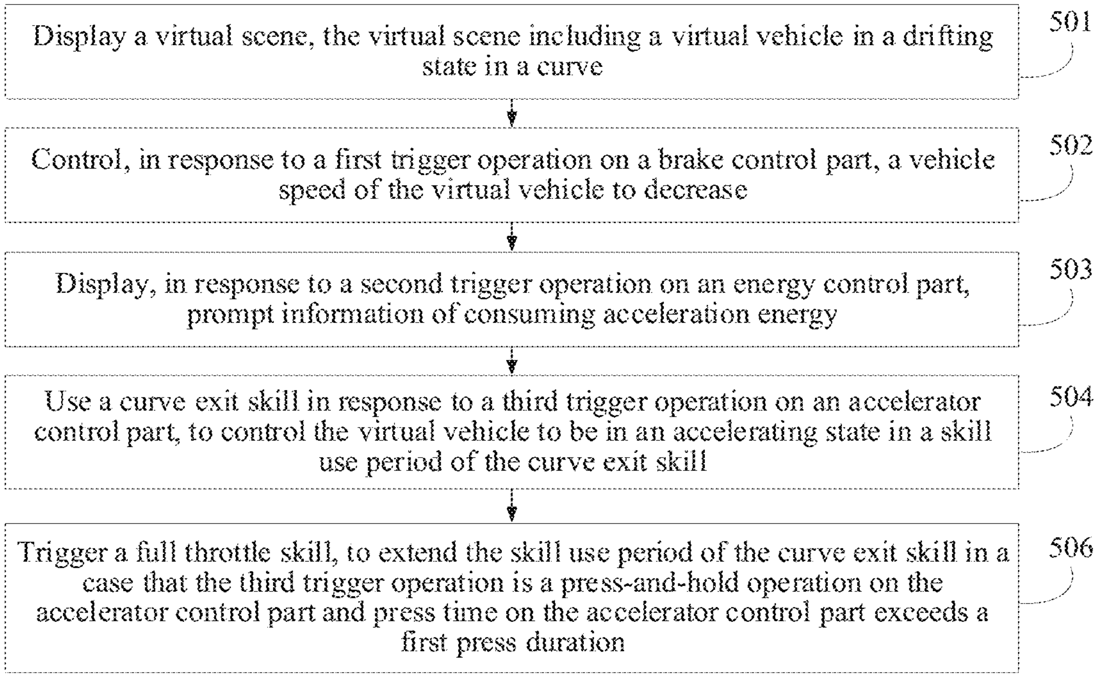
FIG. 11 is a flowchart of a virtual vehicle control method according to an exemplary embodiment of this application.

With reference to FIG. 5, FIG. 11 a flowchart of a virtual vehicle control method according to an exemplary embodiment of this application. In the case that the third trigger operation is a press-and-hold operation on the accelerator control part, the method further includes operation 506 as follows:

Operation 506: Trigger a full throttle skill, to extend the skill use period of the curve exit skill when a press time on the accelerator control part exceeds first press duration.

The first press duration can be set based on actual needs. In some embodiments, a value range of the first press duration is 0.3-1.5 seconds, for example, the first press duration is 0.5 seconds.

Figure 12:
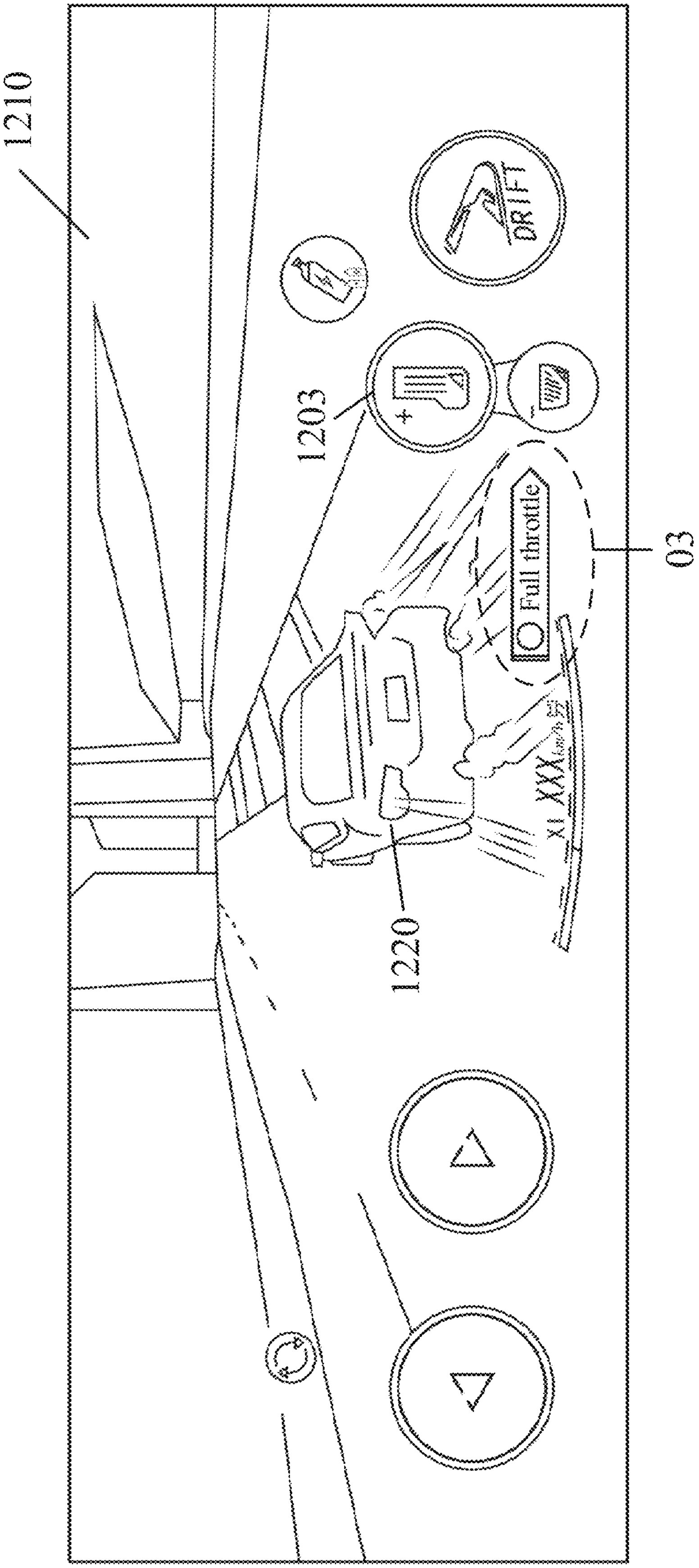
FIG. 12 is a schematic interface diagram of a virtual vehicle control method according to an exemplary embodiment of this application.

FIG. 12 is a schematic interface diagram of a virtual vehicle control method according to an exemplary embodiment of this application. The virtual vehicle 1220 is displayed in the display interface 1210, and the virtual vehicle 1220 is currently in the accelerating state, which is presented upon use of the curve exit skill in response to the trigger operation on the accelerator control 1203.

Taking the first press duration being 0.5 seconds as an example, if the player continues to press the accelerator control 1203 after triggering the curve exit skill, and the press time on the accelerator control 1203 exceeds 0.5 seconds, at this moment, the full throttle skill may be triggered, to extend the skill use period of the curve exit skill, providing a longer acceleration service for the virtual vehicle 1220, so that the acceleration effect of the virtual vehicle 1220 is enhanced.

In some embodiments, in a case where the full throttle skill is used, indication information 03 of successful use of the full throttle skill may also be displayed in the display interface 1210. The indication information 03 may be at least one of a text special effect, an animation special effect, or a sound special effect. The indication information 03 is presented in the form of a text special effect in FIG. 12, but this application is not limited thereto.

In some embodiments, acceleration of the virtual vehicle 1220 is increased when the acceleration of the virtual vehicle 1220 does not reach a maximum value and the full throttle skill is triggered. In order to further enhance the acceleration effect of the virtual vehicle 1220, when the full throttle skill is used, if the acceleration of the virtual vehicle 1220 does not reach the maximum value, the acceleration of the virtual vehicle 1220 may be increased so that the vehicle speed of the virtual vehicle 1220 is increased in a short time.

In conclusion, in the virtual vehicle control method provided by the embodiments of this application, when the press time on the accelerator control part exceeds first press duration, the full throttle skill is triggered by a press-and-hold operation on the accelerator control part, to extend the skill use period of the curve exit skill, so that the acceleration effect of the virtual vehicle is enhanced.

In some embodiments, when the acceleration of the virtual vehicle does not reach the maximum value and the full throttle skill is triggered, the acceleration of the virtual vehicle may further be increased, so that the acceleration effect of the virtual vehicle is further enhanced.

Figure 13:
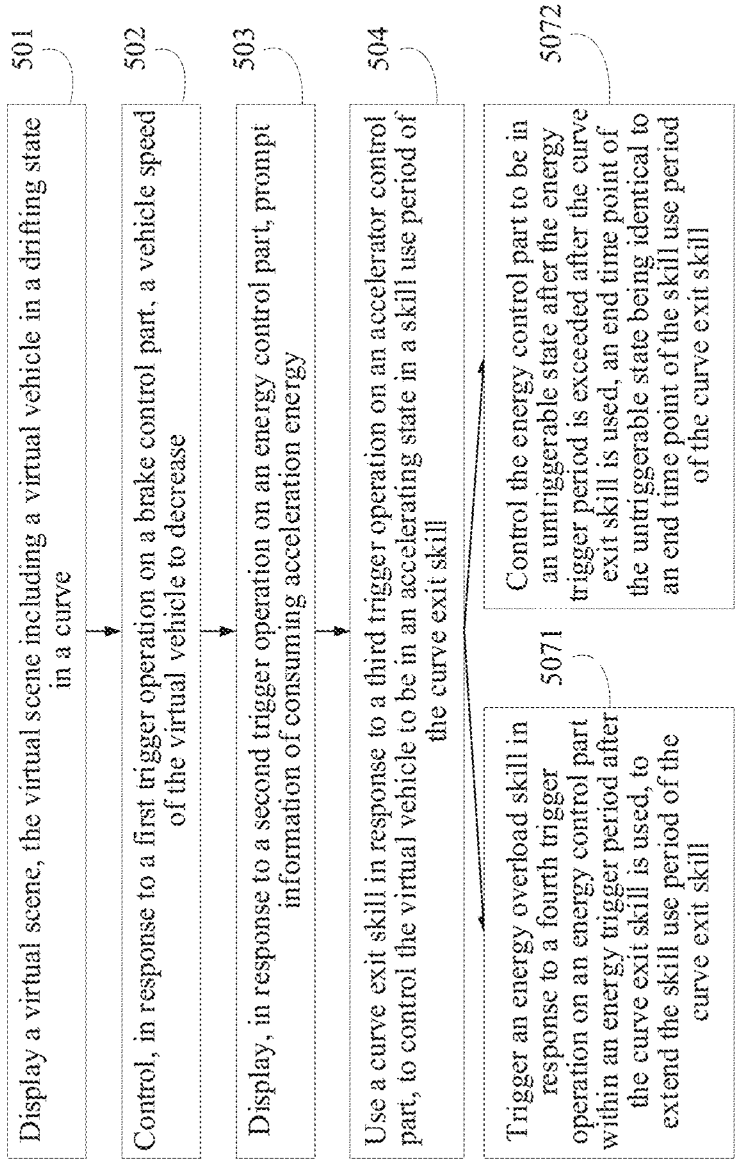
FIG. 13 is a flowchart of a virtual vehicle control method according to an exemplary embodiment of this application.

With reference to FIG. 5, FIG. 13 is a flowchart of a virtual vehicle control method according to an exemplary embodiment of this application. The method further includes operation 5071 and operation 5072 as follows:

Operation 5071: Trigger an energy overload skill in response to a fourth trigger operation on the energy control part within an energy trigger period after the curve exit skill is used, to extend the skill use period of the curve exit skill.

The energy trigger period can be set based on actual needs. In some embodiments, the energy trigger period is 0.3-1 seconds. An energy overload skill may be triggered if a player triggers the energy control part again within 0.3-1 seconds after the curve exit skill is used, to extend the skill use period of the curve exit skill.

Schematically, the fourth trigger operation may be at least one of the following: a single click/tap operation, a double-click/tap operation, a touch operation, a single press operation, and a press-and-hold operation. For example, an energy overload skill is triggered when the player clicks/taps on an energy control within an energy trigger period after the curve exit skill is used, to extend the skill use period for the curve exit skill.

Operation 5072: Control the energy control part to be in an unresponsive state after the energy trigger period after the curve exit skill is used is exceeded.

Schematically, an end time point of the unresponsive state is identical to an end time point of the skill use period of the curve exit skill. Please refer to the above content for the energy trigger period, which will not be repeated herein.

The end time point of the unresponsive state is set in order to avoid functional confusion during the use of the curve exit skill. If a player triggers the energy control part again within the energy trigger period after the curve exit skill is used, a plurality of units of acceleration energy can be consumed multiple times in a short time to accelerate the virtual vehicle. If the player does not trigger the energy control part in the energy trigger period after the curve exit skill is used, the energy control part needs to be locked until the end time point of the skill use period for the curve exit skill, so as to avoid functional confusion.

Operation 5071 and operation 5072 are alternatively performed, and cannot be performed simultaneously.

Figure 14:
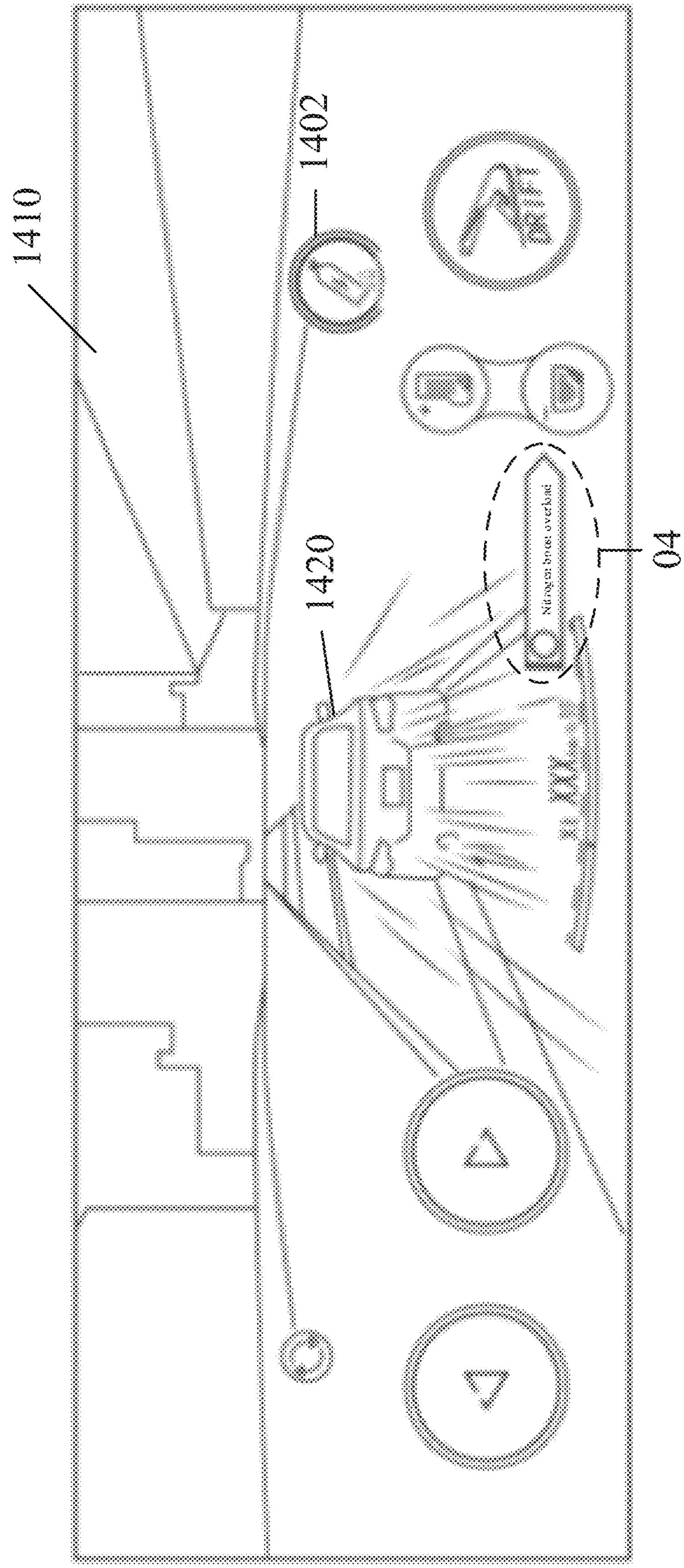
FIG. 14 is a schematic interface diagram of a virtual vehicle control method according to an exemplary embodiment of this application.

FIG. 14 is a schematic interface diagram of a virtual vehicle control method according to an exemplary embodiment of this application. The virtual vehicle 1420 is displayed in the display interface 1410, and the virtual vehicle 1420 is currently in the accelerating state, which is presented upon use of the curve exit skill in response to the trigger operation on the accelerator control 1403.

In the energy trigger period after the curve exit skill is used, the player may choose whether or not to trigger the energy control 1402 again.

If the player triggers the energy control 1402 again, re-use of acceleration energy may be achieved to provide the acceleration service for the virtual vehicle 1420 again. At this time, the energy overload skill is used, to extend the skill use period of the curve exit skill, meeting an acceleration demand of the virtual vehicle 1420, so that the duration of the acceleration of the virtual vehicle 1420 is extended, and thus the acceleration effect of the virtual vehicle 1420 is enhanced.

If the player does not trigger the energy control 1402, the energy control 1402 is controlled to be in the unresponsive state, preventing the energy control 1402 from being triggered again during the use of the current curve exit skill.

In some embodiments, in a case where the energy overload skill is used, indication information 04 of successful use of the energy overload skill may also be displayed in the display interface 1410. The indication information 04 may be at least one of a text special effect, an animation special effect, or a sound special effect. The indication information 04 is presented in the form of a text special effect in FIG. 14, but this application is not limited thereto.

In some embodiments, acceleration of the virtual vehicle 1420 is increased when the acceleration of the virtual vehicle 1420 does not reach a maximum value and the energy overload skill is triggered. In order to further enhance the acceleration effect of the virtual vehicle 1420, when the energy overload skill is used, if the acceleration of the virtual vehicle 1420 does not reach the maximum value, the acceleration of the virtual vehicle 1420 may be increased so that the vehicle speed of the virtual vehicle 1420 is increased in a short time.

In conclusion, in the virtual vehicle control method provided by the embodiments of this application, different control on the virtual vehicle is implemented in the energy trigger period after the curve exit skill is used. Then energy overload skill is triggered in response to a fourth trigger operation on the energy control part, to extend the skill use period of the curve exit skill, so that the acceleration effect of the virtual vehicle is enhanced. If the energy trigger period is exceeded, the energy control part may be controlled to be in the unresponsive state, so that re-triggering of the energy control part is avoided during the use of the curve exit skill.

In some embodiments, when the acceleration of the virtual vehicle does not reach the maximum value and the energy overload skill is triggered, the acceleration of the virtual vehicle may further be increased, so that the acceleration effect of the virtual vehicle is further enhanced.

Figure 15:
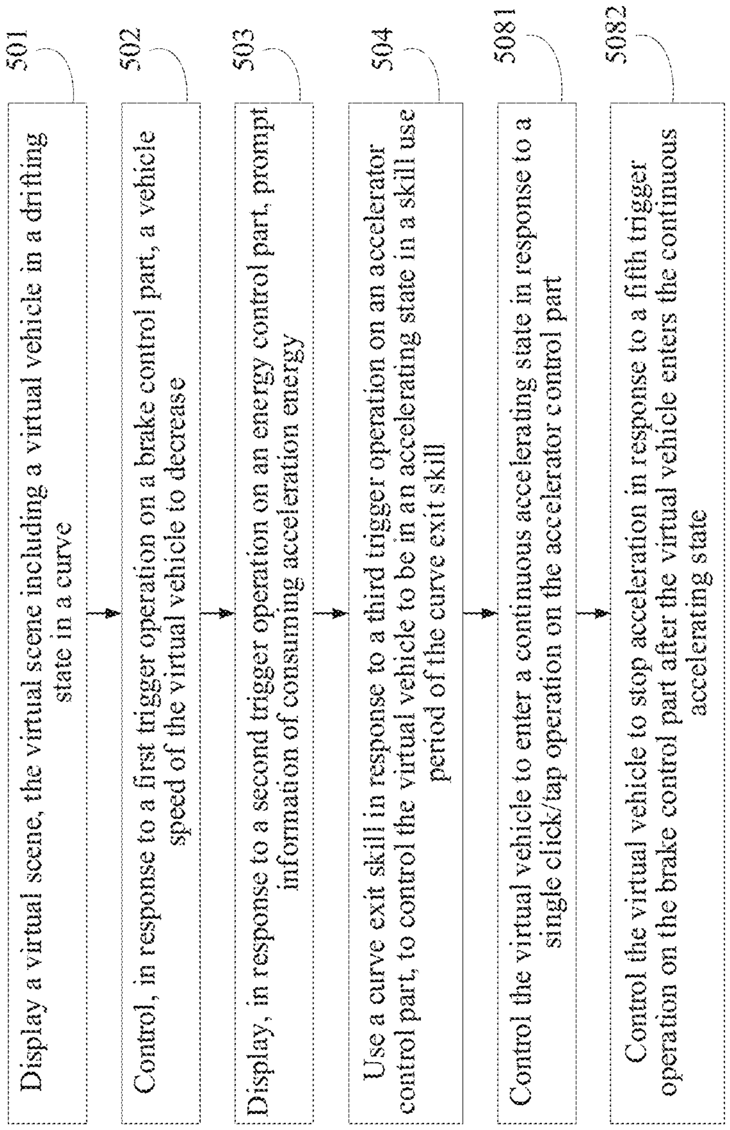
FIG. 15 is a flowchart of a virtual vehicle control method according to an exemplary embodiment of this application.

With reference to FIG. 5, FIG. 15 is a flowchart of a virtual vehicle control method according to an exemplary embodiment of this application. The method further includes operation 5081 and operation 5082 as follows:

Operation 5081: Control the virtual vehicle to enter a continuous accelerating state in response to a single click/tap operation on the accelerator control part.

Schematically, the accelerator control part provided by the embodiments of this application is configured for increasing the vehicle speed of the virtual vehicle. In response to a trigger operation on the accelerator control part, the virtual vehicle is controlled to speed up. The trigger operation on the accelerator control part may be at least one of a single click/tap operation, a double-click/tap operation, a touch operation, a press-and-hold operation, and the like.

In a case that the trigger operation on the accelerator control part is a single click/tap operation, in response to the single click/tap operation on the accelerator control part, a corresponding accelerator of the virtual vehicle automatically remains pressed, so that the virtual vehicle maintains a continuous accelerating state. For example, if a player clicks/taps on the accelerator control in the display interface of the terminal and then releases, the virtual vehicle enters the continuous accelerating state.

Operation 5081 may also be performed before the use of the curve exit skill. The embodiment of this application only takes the example in which operation 5081 is performed after the use of the curve exit skill, but this application is not limited thereto.

Operation 5082: Control the virtual vehicle to stop acceleration in response to a fifth trigger operation on the brake control part after the virtual vehicle enters the continuous accelerating state.

Schematically, the accelerator control part provided by the embodiments of this application is configured for implementing at least one of an acceleration stop function, a deceleration function, or a reverse function of the virtual vehicle.

Based on operation 5081, the virtual vehicle is controlled to enter a continuous accelerating state in response to a single click/tap operation on the accelerator control part. At this moment, if the player triggers the brake control part again, the virtual vehicle is controlled to stop acceleration, for simulating an accelerator rebound state.

The fifth trigger operation may at least one of the following: a single click/tap operation, a double-click/tap operation, a touch operation, a single press operation, and a press-and-hold operation. Operation 5082 may have different implementations based on the differences in the fifth trigger operation.

In some embodiments, when the fifth trigger operation is a single click/tap operation on the brake control part, operation 5082 may also be implemented as follows: controlling the virtual vehicle to stop acceleration and enter a natural decelerating state in response to the fifth trigger operation after the virtual vehicle enters the continuous accelerating state. The natural decelerating state refers to a continuous decelerating state that the virtual vehicle enters due to a resistance factor, and the resistance factor includes at least one of road surface resistance, air resistance, and mechanical loss.

In some embodiments, when the fifth trigger operation is a press-and-hold operation on the brake control part, operation 5082 may also be implemented as follows: controlling the virtual vehicle to stop acceleration and enter a continuous decelerating state in response to the fifth trigger operation after the virtual vehicle enters the continuous accelerating state. The continuous decelerating state refers to a continuous decelerating state that the virtual vehicle enters due to a resistance factor and braking resistance, the resistance factor includes at least one of road surface resistance, air resistance, and mechanical loss, and the braking resistance is generated based on the press-and-hold operation on the brake control part.

The road surface resistance refers to the friction between tires of the virtual vehicle and the ground. The air resistance refers to air resistance experienced by the virtual vehicle during driving. The mechanical loss refers to kinetic energy loss in a transmission apparatus of the virtual vehicle. The magnitude of the braking resistance can be set based on actual needs.

The natural decelerating state is related to a current vehicle speed, and the greater the current vehicle speed is, the greater the deceleration is. The deceleration speed is greater in the continuous decelerating state compared to that in the natural decelerating state. For instance, taking the initial vehicle speed of 100 km/h as an example, it takes 60 seconds for the virtual vehicle to decelerate to 0 km/h in the natural decelerating state, while it only takes 2.5 seconds in the continuous decelerating state.

Operation 5082 may also be performed before the use of the curve exit skill. The embodiment of this application only takes the example in which operation 5082 is performed after the use of the curve exit skill, but this application is not limited thereto. Operation 5081 and operation 5082 may be implemented independently or may be implemented in combination, and this is not limited in this application.

In some embodiments, after the virtual vehicle enters a continuous decelerating state, the virtual vehicle control method provided by the embodiments of this application further includes: controlling the virtual vehicle to enter a reverse state when the vehicle speed of the virtual vehicle is decreased to 0 and the fifth trigger operation is still present. The player may drive the virtual vehicle in a reverse direction by the fifth trigger operation on the brake control part. For example, when the virtual vehicle travels forward (accelerated movement, decelerated movement, or uniform movement), if the player presses and holds the brake control part, the virtual vehicle starts to decelerate. When the vehicle speed of the virtual vehicle decreases to 0, if the player still presses and holds the brake control part, the virtual vehicle is controlled to travel in the reverse direction.

In conclusion, the virtual vehicle control method provided by the embodiments of this application provides the function and use method of the accelerator control part. The virtual vehicle is controlled to enter a continuous accelerating state in response to a single click/tap operation on the accelerator control part, avoiding a situation that the players needs to press and hold the accelerator control part for a long time, and relatively reducing the difficulty in controlling the virtual vehicle.

In some embodiments, based on differences in the fifth trigger operation on the accelerator control part, the embodiments of this application also provide the implementations of deceleration and reverse of the virtual vehicle by the coordinated use of the accelerator control part and the brake control part.

A plurality of embodiments given above may be used in combination.

For example, in response to the first trigger operation on the brake control part, the vehicle speed of the virtual vehicle is controlled to decrease. In response to a second trigger operation on an energy control part, prompt information of consuming acceleration energy is displayed. A first curve exit skill is used in response to the third trigger operation on the accelerator control part when the drift angle of the virtual vehicle is not greater than a first angle, to control the virtual vehicle to be in the accelerating state during a skill use period of the first curve exit skill, and exits the drifting state after a first drifting-exit period. The third trigger operation is a press-and-hold operation on the accelerator control part, and when the press time on the accelerator control part exceeds first press duration, a full throttle skill is triggered, to extend the skill use period of the curve exit skill. The energy overload skill in response to the fourth trigger operation on the energy control part within the energy trigger period after the curve exit skill is used, to extend the skill use period of the curve exit skill again.

Schematically, other combinations which are not listed herein all fall within the scope of this application, and will not be repeated here.

Figure 16:
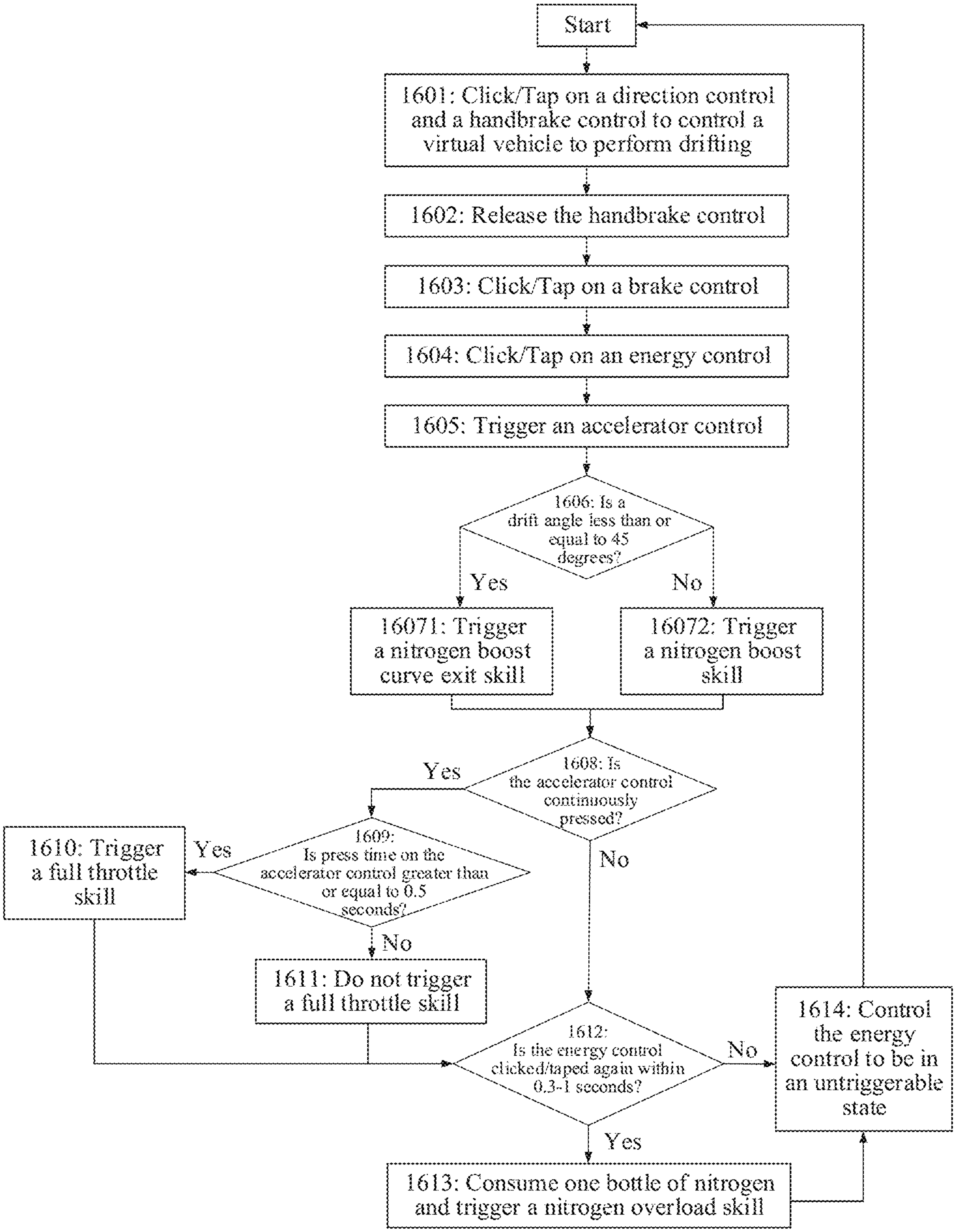
FIG. 16 is a flowchart of a virtual vehicle control method according to an exemplary embodiment of this application.

FIG. 16 is a flowchart of a virtual vehicle control method according to an exemplary embodiment of this application. Taking a case that the virtual vehicle control method provided by this application is implemented by operation of a player on a terminal as an example, with reference to FIG. 17, which is a schematic interface diagram of a virtual vehicle control method according to an exemplary embodiment of this application, the brake control part, the energy control part, and the accelerator control part may be displayed in the style of controls in the display interface 1710. A brake control 1701, an energy control 1702, an accelerator control 1703, a direction control 1704, and a handbrake control 1705 are displayed in the display interface 1710, respectively.

Taking the acceleration energy being nitrogen as an example, the virtual vehicle control method provided by the embodiments of this application further includes:

Operation 1601: Click/Tap on a direction control and a handbrake control to control a virtual vehicle to perform drifting.

Schematically, the virtual vehicle is controlled to enter the drifting state in response to simultaneous trigger operations on the direction control and the handbrake control. The drifting state may also be referred to as a spin state. In the drifting state, the virtual vehicle travels sideslip in an over-steer mode.

Operation 1602: Release the handbrake control.

Schematically, the handbrake control is released to avoid a rapid decrease in the vehicle speed of the virtual vehicle, indirectly ensuring the vehicle speed of the virtual vehicle.

Operation 1603: Click/Tap on a brake control.

The brake control is configured to realize control of grip of the virtual vehicle, and the grip of the virtual vehicle refers to the friction between tires of the virtual vehicle and the ground. The decrease in the vehicle speed of the virtual vehicle is implemented by enhancing the grip of the virtual vehicle.

Schematically, in response to the first trigger operation on the brake control, the vehicle speed of the virtual vehicle is controlled to decrease.

The first trigger operation may be at least one of the following: a single click/tap operation, a double-click/tap operation, a touch operation, a single press operation, and a press-and-hold operation.

Operation 1604: Click/Tap on an energy control.

Schematically, in response to the second trigger operation on the energy control, prompt information of consuming acceleration energy is displayed. The second trigger operation may at least one of the following: a single click/tap operation, a double-click/tap operation, a touch operation, a single press operation, and a press-and-hold operation.

Operation 1605: Trigger an accelerator control.

The accelerator control is configured for realizing an increase in the vehicle speed of the virtual vehicle. The trigger operation on the accelerator control 303 may be at least one of a single click/tap operation, a double-click/tap operation, a touch operation, a press-and-hold operation, and the like.

In some embodiments, in response to a single click/tap operation on the accelerator control, the virtual vehicle is controlled to enter the continuous accelerating state. The player may click/tap on the accelerator control and release same, at this time, the virtual vehicle is in the continuous accelerating state, avoiding the situation that the player presses and holds the accelerator control.

In some embodiments, when the virtual vehicle is in the continuous accelerating state, the brake control is also configured for realizing at least one of an acceleration stop function, a deceleration function, or a reverse function of the virtual vehicle. For example, the virtual vehicle is controlled to stop acceleration and enter a natural decelerating state in response to the single click/tap operation on the brake control after the virtual vehicle enters the continuous accelerating state. The natural decelerating state refers to a continuous decelerating state that the virtual vehicle enters due to a resistance factor, and the resistance factor includes at least one of road surface resistance, air resistance, and mechanical loss. For another example, in response to the press-and-hold operation on the brake control, the virtual vehicle is controlled to stop acceleration and enter the continuous decelerating state. The continuous decelerating state refers to the virtual vehicle entering a continuous decelerating state due to a resistance factor and braking resistance, the resistance factor includes at least one of road surface resistance, air resistance, and mechanical loss, and the braking resistance is generated based on the press-and-hold operation on the brake control.

The road surface resistance refers to the friction between tires of the virtual vehicle and the ground. The air resistance refers to air resistance experienced by the virtual vehicle during driving. The mechanical loss refers to kinetic energy loss in a transmission apparatus of the virtual vehicle. The magnitude of the braking resistance can be set based on actual needs.

In some embodiments, when the virtual vehicle is in the continuous decelerating state, if the vehicle speed of the virtual vehicle decreases to 0 and the continuous pressing on the brake control is still present, the virtual vehicle is controlled to enter a reverse state.

Operation 1606: Determine whether the drift angle of the virtual vehicle is not greater than 45 degrees.

Schematically, the drift angle is configured for indicating the included angle between the vehicle head direction and the speed direction of the virtual vehicle.

The greater the drift angle is, the greater a vehicle body deviation of the virtual vehicle is, and the longer it will take to make the virtual vehicle exit the drifting state. In addition, the drift angle is affected by the grip of the virtual vehicle, and the change of the grip is implemented by the trigger operation on the brake control part.

In some embodiments, before operation 1606 is performed, the drift angle of the virtual vehicle also needs to be calculated.

In view of the foregoing description, the drift angle of the virtual vehicle may be determined based on the grip, the vehicle head direction and the speed direction of the virtual vehicle, and the method for calculating the drift angle may refer to the foregoing, which will not be repeated herein.

In a case that the drift angle of the virtual vehicle is not greater than 45 degrees, operation 16071 is performed. In a case that the drift angle of the virtual vehicle is greater than 45 degrees, operation 16072 is performed. Operation 16071 and operation 16072 are alternatively performed, and cannot be performed simultaneously.

Operation 16071: Trigger a nitrogen boost curve exit skill when the drift angle of the virtual vehicle is not greater than 45 degrees.

Operation 16072: Trigger a nitrogen boost skill when the drift angle of the virtual vehicle is greater than 45 degrees.

The nitrogen boost curve exit skill is the first curve exit skill, and the nitrogen boost skill is the second curve exit skill.

Schematically, when the nitrogen boost curve exit skill is used, the virtual vehicle is controlled to be in an accelerating state during a skill use period of the nitrogen boost curve exit skill, and to exit a drifting state after a first drifting-exit period. In a case that the nitrogen boost skill is used, the virtual vehicle is controlled to be in an accelerating state during a skill use period of the nitrogen boost skill, and to exit a drifting state after a second drifting-exit period. The first drifting-exit period is shorter than the second drifting-exit period.

Operation 1608: Determine whether the accelerator control is continuously pressed.

In a case that the accelerator control is continuously pressed, operation 1609 is performed. In a case that the accelerator control is not continuously pressed, operation 1612 is performed. Operation 1609 and operation 1612 are alternatively performed, and cannot be performed simultaneously.

Operation 1609: Determine whether the press time of the accelerator control is not less than 0.5 seconds.

Schematically, the player triggers the accelerator control, and different curve exit skills may be used based on drift angles of the virtual vehicle. Subsequently, whether the trigger operation on the accelerator control is a single click/tap operation or a press-and-hold operation is determined, and when the trigger operation on the accelerator control is a press-and-hold operation, whether the press time on the accelerator control is greater than 0.5 seconds is further determined.

In a case that the press time of the accelerator control is not less than 0.5 seconds, operation 1610 is performed. In a case that the press time of the accelerator control is less than 0.5 seconds, operation 1611 is performed. Operation 1610 and operation 1611 are alternatively performed, and cannot be performed simultaneously.

Operation 1610: Trigger the full throttle skill when the press time of the accelerator control is less than 0.5 seconds.

Operation 1611: Skip triggering the full throttle skill when the press time of the accelerator control is less than 0.5 seconds.

Schematically, if the player continues to press the accelerator control after triggering the curve exit skill, and the press time on the accelerator control exceeds 0.5 seconds, at this moment, the full throttle skill may be triggered, to extend the skill use period of the curve exit skill, providing a longer acceleration service for the virtual vehicle, so that the acceleration effect of the virtual vehicle is enhanced.

In some embodiments, acceleration of the virtual vehicle is increased when the acceleration of the virtual vehicle does not reach a maximum value and the full throttle skill is triggered. In order to further enhance the acceleration effect of the virtual vehicle, when the full throttle skill is used, if the acceleration of the virtual vehicle does not reach the maximum value, the acceleration of the virtual vehicle may be increased so that the vehicle speed of the virtual vehicle is further increased in a short time.

Operation 1612: Determine whether the energy control is clicked/taped again within 0.3-1 seconds.

Schematically, in the energy trigger period after the curve exit skill is used, the player may choose whether or not to trigger the energy control again. The energy trigger period is 0.3-1 seconds. In view of this, whether the player clicks/taps on the energy control again within 0.3-1 seconds is determined.

In a case that the energy control is clicked/tapped again, operation 1613 is performed. In a case that the energy control is not clicked/tapped again, operation 1614 is performed. Operation 1613 and operation 1614 are alternatively performed, and cannot be performed simultaneously.

Operation 1613: Consume one bottle of nitrogen and trigger a nitrogen overload skill when the energy control is clicked/tapped again.

Operation 1614: Control the energy control to be in an unresponsive state when the energy control is not clicked/tapped again.

Schematically, within 0.3-1 seconds of the energy trigger period, if the player triggers the energy control again, re-use of acceleration energy may be achieved to provide the acceleration service for the virtual vehicle again. At this time, the energy overload skill is used, to extend the skill use period of the curve exit skill, meeting an acceleration demand of the virtual vehicle, so that the duration of the acceleration of the virtual vehicle is extended, and thus the acceleration effect of the virtual vehicle is enhanced.

Within 0.3-1 seconds of the energy trigger period, if the player does not trigger the energy control, the energy control is controlled to be in the unresponsive state, preventing the energy control from being triggered again during the use of the current curve exit skill.

In some embodiments, the energy control being in an unresponsive state may be presented as that the energy control is grayed out in the display interface.

Figure 17:
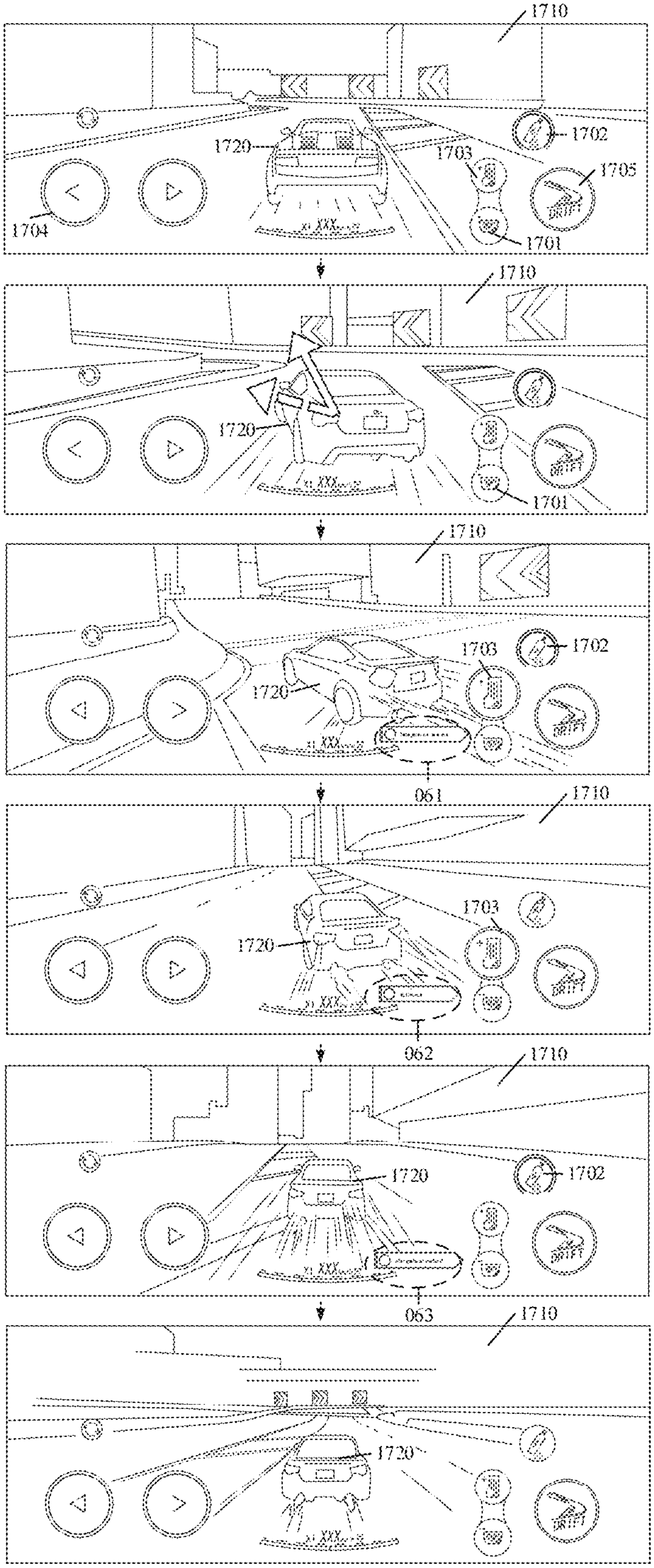
FIG. 17 is a schematic interface diagram of a virtual vehicle control method according to an exemplary embodiment of this application.

With reference to FIG. 17, a virtual vehicle 1720 is displayed in a display interface 1710, and the virtual vehicle control method provided by the embodiments of this application may be implemented as follows:

Operation 1: Control the virtual vehicle 1720 to enter a drifting state in a curve in response to simultaneous trigger operations on the direction control 1704 and the handbrake control 1705.

Operation 2: Control, in response to a first trigger operation on the brake control 1701, a vehicle speed of the virtual vehicle 1720 to decrease, where grip of the virtual vehicle 1720 is enhanced at this time.

Operation 3: Consume one bottle of nitrogen to provide an acceleration service for the virtual vehicle 1720 in response to a second trigger operation on the energy control 1702, and display prompt information of consuming one bottle of nitrogen in the display interface 1710. In a process of consuming nitrogen, in response to a third trigger operation on the accelerator control 1703, the curve exit skill is used based on the drift angle of the virtual vehicle 1720, to control the virtual vehicle to be in an accelerating state in the skill use period of the curve exit skill. In some embodiments, indication information 061 of successful use of the curve exit skill is further displayed in the display interface 1710.

Operation 4: Use a full throttle skill if the press time on the accelerator control 1703 exceeds first press duration when the trigger operation on the accelerator control 1703 is a press-and-hold operation, to extend the skill use period of the curve exit skill, providing a longer acceleration service for the virtual vehicle 1720, so that the acceleration effect of the virtual vehicle 1720 is enhanced. Moreover, if the acceleration of the virtual vehicle 1720 does not reach the maximum value, the acceleration of the virtual vehicle 1720 may be increased so that the vehicle speed of the virtual vehicle 1720 is increased in a short time. In some embodiments, indication information 062 of successful use of the full throttle skill is also displayed in the display interface 1710.

Operation 5: Trigger an energy overload skill in response to a fourth trigger operation on the energy control 1702 within an energy trigger period after the curve exit skill is used, to extend the skill use period for the curve exit skill, providing a longer acceleration service for the virtual vehicle 1720, so that the acceleration effect of the virtual vehicle 1720 is enhanced. Moreover, if the acceleration of the virtual vehicle 1720 does not reach the maximum value, the acceleration of the virtual vehicle 1720 may be increased so that the vehicle speed of the virtual vehicle 1720 is increased in a short time. In some embodiments, indication information 063 of successful use of the energy overload skill is further displayed in the display interface 1710.

Operation 6: Control, after the skill use period of the curve exit skill ends, the acceleration of the virtual vehicle 1720 to be restored to a state before the curve exit skill is used.

In conclusion, in the virtual vehicle control method provided by the embodiments of this application, a curve exit skill is used by sequential trigger operations on a brake control, an energy control, and an accelerator control to control a virtual vehicle to be in an accelerating state during a skill use period, thereby satisfying a speed-up requirement of the virtual vehicle during drifting of the virtual vehicle around a curve.

The first trigger operation on the brake control is configured for enhancing grip of the virtual vehicle. In a case that the virtual vehicle has high grip, a spin speed of the virtual vehicle is increased, and the curve exit skill is used by a second trigger operation on the energy control and a third trigger operation on the accelerator control to achieve acceleration of the virtual vehicle, reducing a sliding distance of the rear part of the virtual vehicle, allowing the vehicle body of the virtual vehicle to be able to be corrected quickly, thereby making a travel track of the virtual vehicle in a curve exit process more reasonable, and achieving a better speed-up effect.

The apparatus embodiments of this application is provided as follows. Please refer to the description in the corresponding method embodiments above for details that are not described in the apparatus embodiments, which will not be repeated herein.

Figure 18:
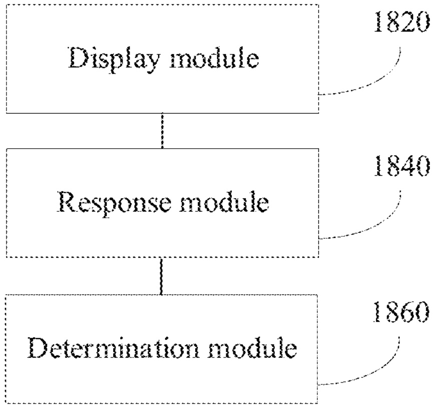
FIG. 18 is a flowchart of a virtual vehicle control apparatus according to an exemplary embodiment of this application.

FIG. 18 is a schematic diagram of a virtual vehicle control apparatus according to an exemplary embodiment of this application. The apparatus includes:

a display module 1820, configured to perform operation 501 in FIG. 5;

a response module 1840, configured to perform operation 502 in FIG. 5;

the response module 1840, further configured to perform operation 503 in FIG. 5; and the response module 1840, further configured to perform operation 504 in FIG. 5.

In some embodiments, the response module 1840 is configured to perform operation 5041 or operation 5042 in FIG. 6.

In some embodiments, the apparatus further includes a determination module 1860 for determining a drift angle based on grip, a vehicle head direction, and a speed direction of the virtual vehicle.

In some embodiments, the response module 1840 is further configured to control the virtual vehicle to enter a forward drive state when an included angle between the vehicle head direction and the speed direction is less than a drifting-exit angle.

In some embodiments, in the case that a third trigger operation is a press-and-hold operation on the accelerator control part, the response module 1840 is configured to perform operation 506 in FIG. 11.

In some embodiments, the response module 1840 is further configured to increase acceleration of the virtual vehicle when the acceleration of the virtual vehicle does not reach a maximum value and a full throttle skill is triggered.

In some embodiments, the response module 1840 is configured to perform operation 5071 or operation 5072 in FIG. 13.

In some embodiments, the response module 1840 is configured to perform operation 5081 or operation 5082 in FIG. 15.

This application further provides a computer device. The computer device includes a memory and a processor. The processor is configured to display a virtual scene, the virtual scene including a virtual vehicle in a drifting state in a curve; control, in response to a first trigger operation on a brake control part, a vehicle speed of the virtual vehicle to decrease; display, in response to a second trigger operation on an energy control part, prompt information of consuming acceleration energy; and use a curve exit skill in response to a third trigger operation on an accelerator control part, to control the virtual vehicle to be in an accelerating state during a skill use period of the curve exit skill. The skill use period of the curve exit skill is configured for indicating accelerating duration of the virtual vehicle, and the skill use period of the curve exit skill is longer than accelerating duration of the virtual vehicle when the acceleration energy is used while the virtual vehicle is not in the drifting state.

This application further provides a non-transitory computer-readable storage medium. The computer-readable storage medium has a computer program stored therein. The computer program is configured for, when executed by a processor, implementing the foregoing virtual vehicle control method.

This application further provides a chip. The chip includes a programmable logic circuit and/or program instructions, for implementing, during running of the chip, the foregoing virtual vehicle control method.

This application further provides a computer program product. The computer program product includes computer instructions, the computer instructions are stored in a computer-readable storage medium, and a processor reads the computer instructions from the computer-readable storage medium and executes the computer instructions to implement the foregoing virtual vehicle control method.

In sum, the term "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each module can be implemented using one or more processors (or processors and memory). Likewise, a processor (or processors and memory) can be used to implement one or more modules. Moreover, each module can be part of an overall module that includes the functionalities of the module.

What is claimed is:

1. A virtual vehicle control method performed by a computer device, the method comprising:

displaying a virtual vehicle in a virtual scene, the virtual vehicle being in a drifting state in a curve;

controlling a vehicle speed of the virtual vehicle to decrease in accordance with a first trigger operation on a brake control part;

displaying prompt information of consuming acceleration energy in accordance with a second trigger operation on an energy control part; and applying a curve exit skill to the virtual vehicle to be in an accelerating state during a skill use period of the curve exit skill in accordance with a third trigger operation on an accelerator control part.

2. The method according to claim 1, wherein the applying a curve exit skill to the virtual vehicle to be in an accelerating state during a skill use period of the curve exit skill in accordance with a third trigger operation on an accelerator control part comprises:

when a drift angle of the virtual vehicle is not greater than a first angle, applying a first curve exit skill to the virtual vehicle to be in the accelerating state during a skill use period of the first curve exit skill and causing the virtual vehicle to exit the drifting state after a first drifting-exit period; and when the drift angle of the virtual vehicle is greater than the first angle, applying a second curve exit skill to the virtual vehicle to be in the accelerating state during a skill use period of the second curve exit skill, and causing the virtual vehicle to exit the drifting state after a second drifting-exit period, the first drifting-exit period being shorter than the second drifting-exit period.

3. The method according to claim 2, wherein the drift angle is determined according to a grip force, a vehicle head direction, and a speed direction of the virtual vehicle.

4. The method according to claim 3, wherein the virtual vehicle is configured to enter a forward drive state when an included angle between the vehicle head direction and the speed direction is less than a drifting-exit angle.

5. The method according to claim 1, wherein the third trigger operation is a press-and-hold operation on the accelerator control part, and the method further comprises:

triggering a full throttle skill, to extend the skill use period of the curve exit skill when a press time on the accelerator control part exceeds first press duration; and increasing acceleration of the virtual vehicle until the acceleration of the virtual vehicle reaches a maximum value.

6. The method according to claim 1, further comprising:

triggering an energy overload skill in response to a fourth trigger operation on the energy control part within an energy trigger period.

7. The method according to claim 6, further comprising:

controlling the energy control part to be in an unresponsive state after the energy trigger period is exceeded.

8. The method according to claim 1, wherein the virtual vehicle is configured to enter a continuous accelerating state in response to a single click/tap operation on the accelerator control part.

9. The method according to claim 8, wherein the virtual vehicle is configured to stop acceleration in response to a fifth trigger operation on the brake control part after the virtual vehicle enters the continuous accelerating state.

10. The method according to claim 1, wherein the skill use period of the curve exit skill is longer than accelerating duration of the virtual vehicle when the acceleration energy is used while the virtual vehicle is not in the drifting state.

11. A computer device, comprising a processor and a memory, the memory having a computer program stored therein, and the computer program being loaded and executed by the processor and causing the computer device to perform a virtual vehicle control method including:

displaying a virtual vehicle in a virtual scene, the virtual vehicle being in a drifting state in a curve;

controlling a vehicle speed of the virtual vehicle to decrease in accordance with a first trigger operation on a brake control part;

displaying prompt information of consuming acceleration energy in accordance with a second trigger operation on an energy control part; and applying a curve exit skill to the virtual vehicle to be in an accelerating state during a skill use period of the curve exit skill in accordance with a third trigger operation on an accelerator control part.

12. The computer device according to claim 11, wherein the applying a curve exit skill to the virtual vehicle to be in an accelerating state during a skill use period of the curve exit skill in accordance with a third trigger operation on an accelerator control part comprises:

when a drift angle of the virtual vehicle is not greater than a first angle, applying a first curve exit skill to the virtual vehicle to be in the accelerating state during a skill use period of the first curve exit skill and causing the virtual vehicle to exit the drifting state after a first drifting-exit period; and when the drift angle of the virtual vehicle is greater than the first angle, applying a second curve exit skill to the virtual vehicle to be in the accelerating state during a skill use period of the second curve exit skill, and causing the virtual vehicle to exit the drifting state after a second drifting-exit period, the first drifting-exit period being shorter than the second drifting-exit period.

13. The computer device according to claim 12, wherein the drift angle is determined according to a grip force, a vehicle head direction, and a speed direction of the virtual vehicle.

14. The computer device according to claim 13, wherein the virtual vehicle is configured to enter a forward drive state when an included angle between the vehicle head direction and the speed direction is less than a drifting-exit angle.

15. The computer device according to claim 11, wherein the third trigger operation is a press-and-hold operation on the accelerator control part, and the method further comprises:

triggering a full throttle skill, to extend the skill use period of the curve exit skill when a press time on the accelerator control part exceeds first press duration; and increasing acceleration of the virtual vehicle until the acceleration of the virtual vehicle reaches a maximum value.

16. The computer device according to claim 11, wherein the method further comprises:

triggering an energy overload skill in response to a fourth trigger operation on the energy control part within an energy trigger period.

17. The computer device according to claim 16, wherein the method further comprises:

controlling the energy control part to be in an unresponsive state after the energy trigger period is exceeded.

18. The computer device according to claim 11, wherein the virtual vehicle is configured to enter a continuous accelerating state in response to a single click/tap operation on the accelerator control part.

19. The computer device according to claim 11, wherein the skill use period of the curve exit skill is longer than accelerating duration of the virtual vehicle when the acceleration energy is used while the virtual vehicle is not in the drifting state.

20. A non-transitory computer-readable storage medium, having a computer program stored thereon, the computer program being loaded and executed by a processor of a computer device and causing the computer device to perform a virtual vehicle control method including:

displaying a virtual vehicle in a virtual scene, the virtual vehicle being in a drifting state in a curve;

controlling a vehicle speed of the virtual vehicle to decrease in accordance with a first trigger operation on a brake control part;

displaying prompt information of consuming acceleration energy in accordance with a second trigger operation on an energy control part; and applying a curve exit skill to the virtual vehicle to be in an accelerating state during a skill use period of the curve exit skill in accordance with a third trigger operation on an accelerator control part.

* * * * *